United States Patent
Ishihara

(10) Patent No.: US 9,329,714 B2
(45) Date of Patent: May 3, 2016

(54) INPUT DEVICE, INPUT ASSISTANCE METHOD, AND PROGRAM

(71) Applicant: PANASONIC INTELLECTUAL PROPERTY CORPORATION OF AMERICA, Torrance, CA (US)

(72) Inventor: Tomohiro Ishihara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/395,162

(22) PCT Filed: Mar. 15, 2013

(86) PCT No.: PCT/JP2013/001800
§ 371 (c)(1),
(2) Date: Oct. 17, 2014

(87) PCT Pub. No.: WO2013/161171
PCT Pub. Date: Oct. 31, 2013

(65) Prior Publication Data
US 2015/0062033 A1 Mar. 5, 2015

(30) Foreign Application Priority Data
Apr. 26, 2012 (JP) ................. 2012-101657

(51) Int. Cl.
*G06F 3/041* (2006.01)
*G06F 3/01* (2006.01)
(Continued)

(52) U.S. Cl.
CPC .............. *G06F 3/041* (2013.01); *G06F 3/017* (2013.01); *G06F 3/044* (2013.01);
(Continued)

(58) Field of Classification Search
CPC ... G06F 3/017; G06F 3/04883; G06F 3/0488; G06F 2203/04808; G06F 2203/04101; G06F 3/044; G06F 3/04842; G06F 2203/04104; G06F 2203/04108
USPC ................. 345/157, 173; 715/863; 178/18.01
See application file for complete search history.

(56) References Cited

U.S. PATENT DOCUMENTS

2003/0214481 A1* 11/2003 Xiong ........................... 345/157
2004/0243747 A1 12/2004 Rekimoto
(Continued)

FOREIGN PATENT DOCUMENTS

JP 2002-342033 11/2002
JP 2003-108923 4/2003
(Continued)

OTHER PUBLICATIONS

International Search Report and Written Opinion (ISR/WO) in PCT/JP2013/001800, mail date is May 7, 2013, together with an English language translation of ISR.

*Primary Examiner* — Koosha Sharifi-Tafreshi
(74) *Attorney, Agent, or Firm* — Greenblum & Bernstein, P.L.C.

(57) ABSTRACT

The present invention includes a display section displaying data in a screen, a touch panel detecting proximity of a finger, a proximity coordinate extracting section extracting proximity coordinates of the finger in the proximity, a pointer coordinate calculating section calculating, when proximity of a plurality of fingers is simultaneously detected, a position Pc2 in the screen corresponding to a middle point Pc of positions of the plurality of fingers as pointer coordinates, a display controlling section causing visual information PT to be displayed in the position corresponding to the pointer coordinates in the screen, and an event detecting section detecting an event for executing prescribed processing when a distance between the plurality of fingers has become equal to or smaller than a prescribed distance.

6 Claims, 12 Drawing Sheets

(51) Int. Cl.
*G06F 3/044* (2006.01)
*G06F 3/0488* (2013.01)
*G06F 3/0484* (2013.01)

(52) U.S. Cl.
CPC ....... *G06F 3/04842* (2013.01); *G06F 3/04883* (2013.01); *G06F 2203/04101* (2013.01); *G06F 2203/04104* (2013.01)

(56) References Cited

U.S. PATENT DOCUMENTS

| | | | |
|---|---|---|---|
| 2007/0247435 A1* | 10/2007 | Benko et al. | 345/173 |
| 2007/0257891 A1 | 11/2007 | Esenther et al. | |
| 2009/0021387 A1 | 1/2009 | Hosono | |
| 2010/0090964 A1* | 4/2010 | Soo et al. | 345/173 |
| 2010/0125815 A1* | 5/2010 | Wang et al. | 715/856 |
| 2011/0018806 A1* | 1/2011 | Yano | 345/163 |
| 2011/0175829 A1 | 7/2011 | Miyazawa et al. | |
| 2011/0193778 A1* | 8/2011 | Lee et al. | 345/158 |
| 2011/0316790 A1* | 12/2011 | Ollila et al. | 345/173 |
| 2012/0068963 A1 | 3/2012 | Esenther et al. | |
| 2012/0206375 A1* | 8/2012 | Fyke et al. | 345/173 |
| 2013/0257761 A1* | 10/2013 | Karlsson | 345/173 |
| 2014/0022214 A1 | 1/2014 | Miyazawa et al. | |
| 2014/0293165 A1 | 10/2014 | Rekimoto | |
| 2014/0300579 A1 | 10/2014 | Rekimoto | |
| 2015/0160819 A1* | 6/2015 | Hwang et al. | 715/769 |

FOREIGN PATENT DOCUMENTS

| | | |
|---|---|---|
| JP | 2007-299384 | 11/2007 |
| JP | 2009-26155 | 2/2009 |
| JP | 2011-150413 | 8/2011 |
| JP | 2012-008666 | 1/2012 |
| WO | 2011/161312 | 12/2011 |

* cited by examiner

| TIME POINT | FIRST FINGER COORDINATES (x,y,z) | SECOND FINGER COORDINATES (x,y,z) | FINGER DISTANCE | POINTER COORDINATES (x,y,z) |
|---|---|---|---|---|
| 1 | (10, 20, 10) | (80, 70, 10) | 86 | (45, 45, 10) |
| 2 | (10, 30, 10) | (90, 70, 10) | 89 | (50, 50, 10) |
| 3 | (15, 40, 10) | (25, 50, 10) | 14 | (20, 45, 10) |
| .. | .. | .. | .. | .. |
| ↑D1 | ↑D2 | ↑D3 | ↑D4 | ↑D5 |

INPUT DEVICE, INPUT ASSISTANCE METHOD, AND PROGRAM

TECHNICAL FIELD

The present invention relates to an input device, an input assistance method, and a program in which an input operation by a user is accepted via a touch panel.

BACKGROUND ART

In recent years, many electronic devices such as mobile phone terminals are equipped with a touch panel as an input device for accepting an input operation by a user. In such a type of electronic devices, a transparent touch panel is provided over a screen of a display section (such as an LCD (Liquid Crystal Display) or an organic EL (Electroluminescence) display) for allowing a user to perform an intuitive operation. Accordingly, each position on the screen can be made to correspond to an operating position on the touch panel. In other words, by touching a desired operation target (an object such as a button or an icon) directly with a finger, an instruction for operating the corresponding object can be issued in such an electronic device.

Besides, the technology of a touch panel has been developing in these years, and in addition to a touch panel in which a touch operation is detected as an input operation by a user, a touch panel in which proximity of a user finger is detected as an input operation by a user has been developed. As the touch panel in which proximity of a finger is detected, for example, a non-contact type user input device disclosed in Patent Document 1 is known.

The non-contact type user input device disclosed in Patent Document 1 has the following configuration. The non-contact type user input device includes a plurality of linear transmitting electrodes, a transmitter for supplying a transmission AC current to each of the transmitting electrodes, a plurality of linear receiving electrodes disposed so as not to be in contact with the transmitting electrodes, and a receiver for receiving an AC current flowing through each receiving electrode. A capacitor is formed on each of intersectional points between the transmitting electrodes and the receiving electrodes, and the electrostatic capacity of the capacitor is varied in accordance with the degree of proximity of a fingertip. Accordingly, on the basis of the variation of the electrostatic capacity, the non-contact type user input device can recognize a distance between the touch panel and the finger.

CITATION LIST

Patent Document

Patent Document 1: JP-A-2002-342033

DISCLOSURE OF THE INVENTION

Problems to be Solved by the Invention

In employing the touch panel disclosed in Patent Document 1, the input device can react with the position of a finger merely by placing the finger in a proximity state even when a user does not touch a screen with the finger. Besides, coordinates corresponding to the position of the finger can be detected. Accordingly, the position of, for example, a pointer or a cursor displayed in the screen can be moved in accordance with the position of a finger brought to the proximity of the screen. In other words, a user can move the pointer to a position of an object (such as a button) corresponding to an operation target without touching the screen with a finger.

Merely by moving the pointer to the position of the object corresponding to the operation target, however, the corresponding object cannot be determined as the operation target for actually performing some processing on the object. Also in the case where a general input device (such as a mouse) is operated, after moving a pointer by operating the mouse, it is necessary to issue a determination instruction by a click operation of a button of the mouse.

As for a technique for realizing, in a touch panel, an input similar to the click operation in operating a mouse, various methods as follows can be presumed.

In a first method, a special button is provided in a portion other than the touch panel, and it is regarded that a determination instruction is input when this button is pressed. In a second method, it is regarded that a determination instruction is input when a touch with a finger on a touch panel is detected. In a third method, it is regarded that a determination instruction is input when a pointer is detected to be in a halt state for a prescribed period of time.

If the first method is employed, however, it is necessary to provide the special button separately from the touch panel, and hence, the structure of the input device is complicated, and in addition, there is a possibility that an operational problem such as difficulty of one-hand operation may arise.

Next, if the second method is employed, even when a touch panel capable of detecting a proximity state of a finger is employed, a screen is touched with a finger every time of a determination instruction, and therefore, dirt derived from fingerprints adheres to the screen. Besides, when the touch panel is touched with a finger, an object displayed as an operation target is difficult to see because it is behind the finger, and hence, it is difficult to position the finger on the object.

If the third method is employed, it is necessary to wait for a prescribed period of time before inputting a determination instruction. Accordingly, there is a disadvantage in responsibility in accepting an input operation. Besides, even when a user does not intend to determine, if a halt state of the pointer is detected as a result of a finger placed in a halt state continuously for a prescribed period of time, it is regarded as the determination instruction, and therefore, there is a possibility of an operation mistake.

The present invention was accomplished in consideration of the aforementioned conventional circumstances, and an object is to provide an input device, an input assistance method, and a program for simply realizing intuitive determination processing for an object displayed in a screen in accordance with an input operation performed by a user on a touch panel.

Means for Solving the Problem

The present invention relates to an input device, including: a display section which displays data in a prescribed screen; a touch panel which detects proximity of a finger to the screen; a proximity coordinate extracting section which extracts proximity coordinates corresponding to a position of the finger in the proximity of the screen; a pointer coordinate calculating section which calculates, when proximity of a plurality of fingers is simultaneously detected, a position in the screen corresponding to a middle point of positions of the plurality of fingers as pointer coordinates on the basis of proximity coordinates of the plurality of fingers; a display controlling section which controls to display an indicator corresponding to the pointer coordinates in the calculated position in the screen; and an event detecting section which detects an event for executing prescribed processing when a finger distance between the plurality of fingers has become equal to or smaller than a prescribed distance.

Alternatively, the present invention relates to an input assistance method for an input device including a display section displaying data in a prescribed screen, including: a step of detecting proximity of a finger to the screen; a step of extracting proximity coordinates corresponding to a position of the finger in the proximity of the screen; a step of calculating, when proximity of a plurality of fingers is simultaneously detected, a position in the screen corresponding to a middle point of positions of the plurality of fingers as pointer coordinates on the basis of proximity coordinates of each of the plurality of fingers; a step of displaying an indicator corresponding to the pointer coordinates in the calculated position in the screen; and a step of detecting, when a finger distance between the plurality of fingers has become equal to or smaller than a prescribed distance, an event for executing prescribed processing.

Alternatively, the present invention relates to a program for causing a computer executing as an input device including a display section displaying data in a prescribed screen to realize: a step of detecting proximity of a finger to the screen; a step of extracting proximity coordinates corresponding to a position of the finger in the proximity of the screen; a step of calculating, when proximity of a plurality of fingers is simultaneously detected, a position in the screen corresponding to a middle point of positions of the plurality of fingers as pointer coordinates on the basis of proximity coordinates of each of the plurality of fingers; a step of displaying an indicator corresponding to the pointer coordinates in the calculated position in the screen; and a step of detecting, when a finger distance between the plurality of fingers has become equal to or smaller than a prescribed distance, an event for executing prescribed processing.

Owing to these configurations, intuitive determination processing for an object displayed in a screen can be simply realized in accordance with an input operation performed by a user on a touch panel.

Effects of the Invention

According to the present invention, intuitive determination processing for an object displayed in a screen can be simply realized in accordance with an input operation performed by a user on a touch panel.

MODE FOR CARRYING OUT THE INVENTION

Figure 1:
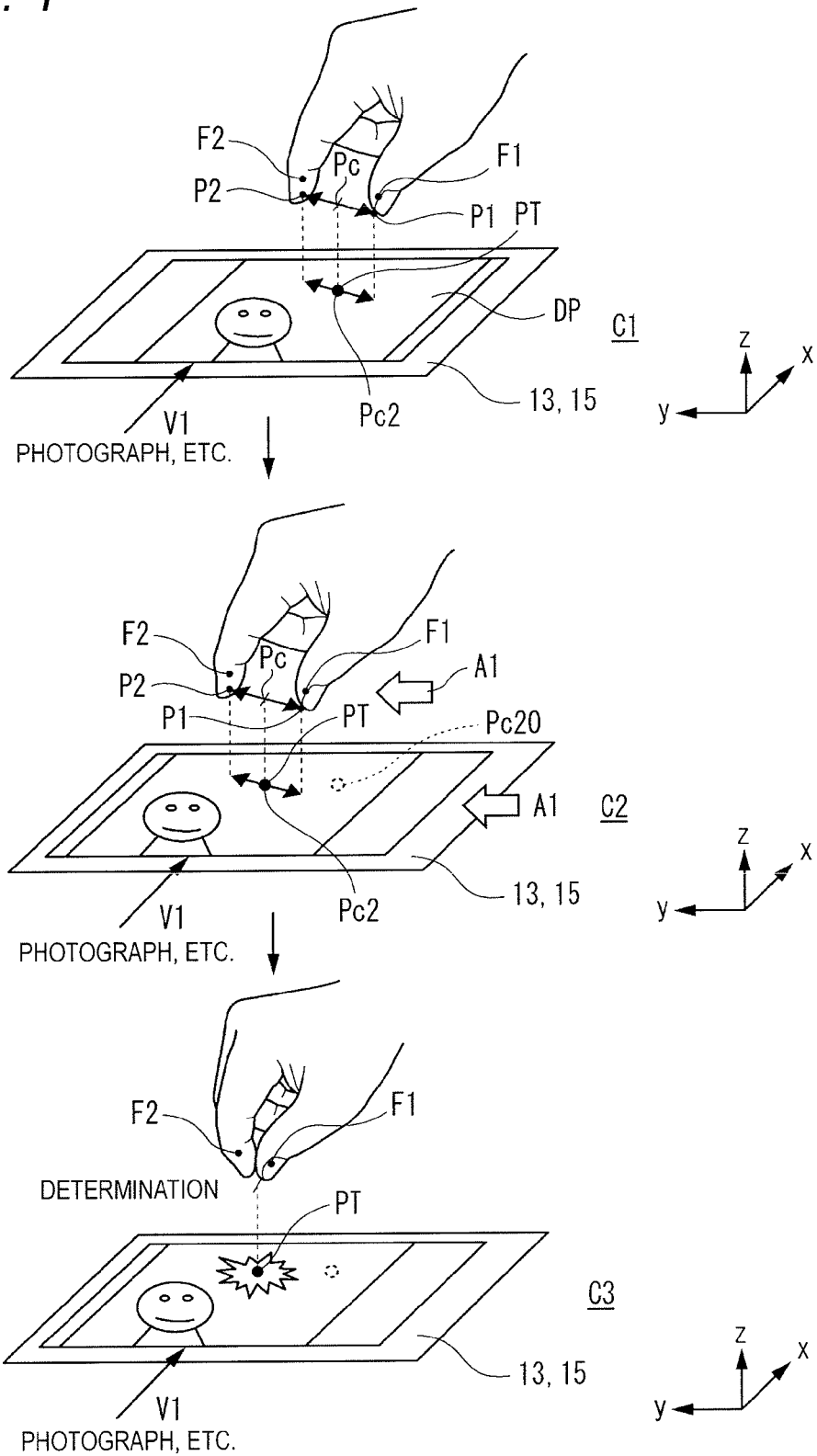
FIG. 1 is an explanatory diagram illustrating a specific example of state transition occurring in operating an input device of each embodiment.

Now, specific embodiments of an input device, an input assistance method, and a program of the present invention will be described with reference to the accompanying drawings.

<Description of Assumptions>

An input device of the present invention can be mounted as an electronic device including a display section having a function to display various information in a screen as visible information. Specific examples of such an electronic device include a mobile phone, a smartphone, a tablet terminal, a digital still camera, a PDA (Personal Digital Assistant) and an electronic book terminal. In the following description, a case where the input device of the present invention is included in a smartphone will be described as a representative example.

Incidentally, the present invention can be expressed in the form of an input device as a device or in the form of a program for operating the input device as a computer. Besides, the present invention can be expressed in the form of an input assistance method including respective operations (steps) executed by the input device. In other words, the present invention can be expressed in any of the categories of a device, a method, and a program.

The input device of the present invention can accept an input operation by a user for executing "prescribed processing". The "prescribed processing" is performed on, for example, a data file of content, a partial area of content, an application, an icon associated with content or an application, or a hyperlinked character string. Specific examples of the content include a still image, a dynamic image, a character string, voice information, and a combination of a plurality of these.

Representative examples of the "prescribed processing" are as follows. A first example of the "prescribed processing" is processing for starting an application specified by a user operation. A second example of the "prescribed processing" is processing for opening a file of content specified by a user operation. A third example of the "prescribed processing" is processing for executing a function specified by a user operation in a started application. A fourth example of the "prescribed processing" is processing for performing edition specified by a user operation on content currently processed.

As described later, the input device of the present invention grasps the position of a finger of a user on the surfaces of a touch panel and a screen corresponding to a user operating surface or in a space in the proximity of the surface of the screen. For expressing the position, position information along three axes mutually crossing at right angles, namely, along x-axis, y-axis and z-axis directions, is used. Here, the x-axis and the y-axis are axes parallel to the surface of the touch panel. Besides, the z-axis is an axis vertical to the surface of the touch panel.

Besides, in the following description, for expressing a position of an instruction medium, such as a finger of a user, on a plane parallel to the surface of the touch panel, biaxial coordinates (x, y) are used. Also, for expressing a spatial position of the instruction medium, such as a finger of a user, brought to the proximity of the surface of the touch panel, triaxial coordinates (x, y, z) are used. The position along the z axis in the triaxial coordinates (x, y, z) corresponds to a height in the vertical (z) direction above the surface of the touch panel.

Incidentally, the following description will be given by using a finger of a user as an example of the instruction medium used on the touch panel, but the instruction medium is not limited to a finger but may be a conductive stylus held by a hand of a user. Besides, the instruction medium is not especially limited as long as it is a medium whose proximity to and touch on the touch panel can be detected in accordance with the structure and the detection method employed in the touch panel.

Moreover, in the following description, an operation to hold a finger in a spatial position away from the plane of the touch panel, or an operation to slide the finger from the spatial position away from the plane of the touch panel substantially parallel to the plane of the touch panel is defined as a "hover operation". Accordingly, an operation to directly touch the plane of the touch panel with a finger is not a "hover operation" but a "touch operation". Incidentally, a distance between a finger and the plane of the touch panel in a hover operation is in inverse proportion to electrostatic capacity detected by the touch panel, and therefore, is preferably a distance corresponding to a range of the electrostatic capacity detectable by the touch panel.

<Specific Examples of User Operation and Performance>

FIG. 1 is an explanatory diagram illustrating a specific example of state transition occurring when an input device of each embodiment is operated. FIG. 1 illustrates transition from state C1 to state C2, and subsequently from sate C2 to state C3.

As illustrated in FIG. 1, a display section 13 and a touch panel 15 are provided on the top surface of a housing corresponding to an operating surface of the input device. Besides, visual information V1 of operable content is displayed in a screen DP of the display section 13. Furthermore, a pointer PT is displayed as an indicator indicating a position (point) of an operation target.

In state C1 of FIG. 1, it is illustrated that a user holds two fingers F1 (such as a thumb; the same applies hereinafter) and F2 (such as a forefinger; the same applies hereinafter) in a proximity position to the operating surface (the touch panel 15) for performing a "hover operation". However, in state C1 of FIG. 1, the two fingers F1 and F2 are at a distance from each other. The position P1 of the finger F1 is expressed as proximity coordinates (x1, y1, z1), and the position F2 of the finger F2 is expressed as proximity coordinates (x2, y2, z2).

In state C1 of FIG. 1, since the two fingers F1 and F2 are simultaneously held, the input device calculates, as pointer coordinates, coordinates (xc, yc, zc) of a position Pc corresponding to a middle point between the position P1 of the finger F1 and the position P2 of the finger F2. Besides, the input device 1 obtains a position Pc2 on the operating surface (the touch panel 15) directly below the position Pc, namely, coordinates (xc, yc) of a position in the screen DP corresponding to the position Pc on the operating surface (the touch panel 15), and displays the pointer PT in the position Pc2.

Incidentally, a display pattern of the pointer PT is preferably a special pattern indicating that the two fingers are in a proximity state, so that the user can easily recognize a current operating state or a state where a target is indicated as an operation target. Accordingly, a display pattern, as illustrated as the pointer PT in FIG. 1, including a circle corresponding to the position Pc2, an arrow extending from the circle toward the position P1 and an arrow extending from the circle toward the position P2 is used.

In state C2 illustrated in FIG. 1, it is illustrated that the user moves the whole hand including the fingers F1 and F2 parallel from state C1 in a direction of an arrow A1. In other words, with the distance between the position P1 of the finger F1 and the position P2 of the finger F2 retained constant, the positions P1 and P2 move parallel in the direction of the arrow A1 due to the parallel movement of the hand.

In the case where the positions P1 and P2 move parallel with the distance therebetween retained as in state C2 illustrated in FIG. 1, the input device updates the display position of the pointer PT, namely, the values of the pointer coordinates, during or after the movement. In other words, the input device 1 calculates the coordinates (xc, yc, zc) of the position Pc of the middle point again on the basis of the positions P1 and P2 having been changed as a result of the parallel movement of the hand. Thus, in the input device 1, a user can freely move pointer coordinates merely moving his/her fingers or hand parallel along the screen so that various operation targets displayed in the screen can be freely selected. Incidentally, parallel movement herein is not limited to absolute parallel but may be substantially parallel movement close to absolute parallel. The distance between the position P1 and the position P2 may be varied within a range of a prescribed value, and the movement may be slightly shifted from absolute parallel. Besides, with respect to simultaneous movement of a plurality of positions, there may be a small difference in time of making the movement.

Furthermore, the input device 1 obtains the coordinates (xc, yc) of the position Pc2 on the operating surface (the touch panel 15) directly below the position Pc, and moves the pointer PT to the position Pc2. Accordingly, the display position of the pointer PT moves to the position Pc2 from a position Pc20 corresponding to the pointer coordinates attained in state C1 of FIG. 1.

Therefore, the user can freely move the position of the pointer PT displayed in the screen DP by moving his/her hand. Here, since there is a gap between the fingers F1 and F2, if the user looks down the screen DP from above, he/she can easily visually check the display of the pointer PT and the display content around it through the gap between the fingers F1 and F2.

In state C3 illustrated in FIG. 1, it is illustrated that the user moves the fingers F1 and F2 close to each other to bring them into contact with each other from state C2. The contact between the fingers F1 and F2 means a determination operation by the user. Specifically, it is necessary to perform a determination operation for determining whether or not processing can be executed on an object corresponding to an operation target (such as an icon of content) displayed in the position specified by the pointer PT. The determination operation can be allocated as a function similar to the "click operation" employed in using a general input device (such as a mouse).

In state C3 illustrated in FIG. 1, the input device 1 accepts the determination operation. Specifically, the input device 1 detects that a distance between the position P1 of the finger F1 and the position P2 of the finger F2 has become equal to or smaller than a prescribed value, and accepts the determination operation on the object corresponding to the operation target specified by the pointer PT. Besides, the input device 1 changes the display pattern of the pointer PT to a pattern corresponding to the acceptance of the determination operation.

<Hardware Configuration of Input Device Common to Embodiments>

Figure 2:
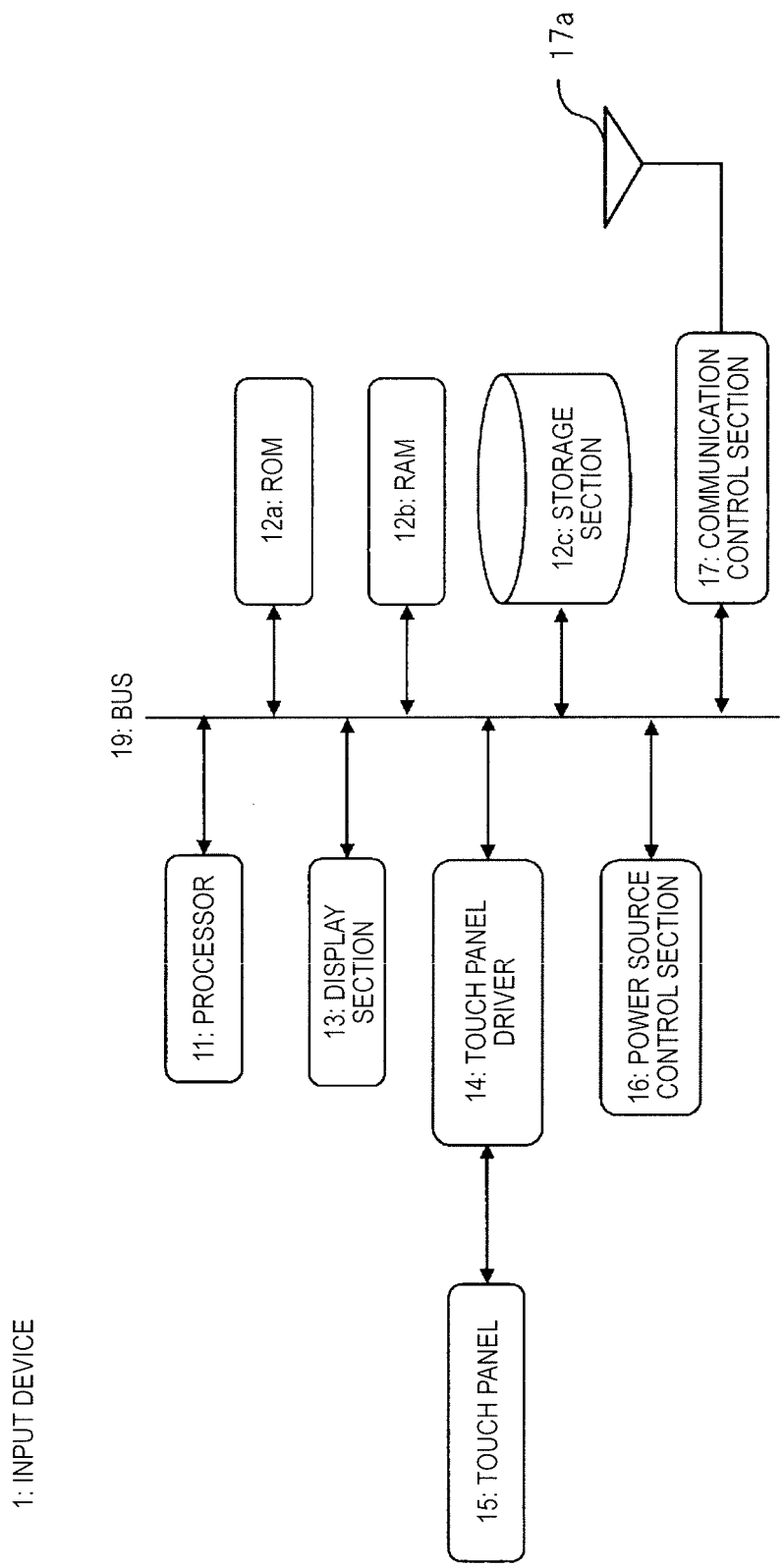
FIG. 2 is a block diagram illustrating an example of the hardware configuration of the input device of each embodiment.

The hardware configuration of the input device 1 common to the respective embodiments will be described with reference to FIG. 2. FIG. 2 is a block diagram illustrating an example of the hardware configuration of the input device 1 of each embodiment.

The input device 1 of FIG. 2 includes a processor 11, a ROM (Read Only Memory) 12a, a RAM (Random Access Memory) 12b, a storage section 12c, a display section 13, a touch panel driver 14, a touch panel 15, a power source control section 16, and a communication control section 17 connected to an antenna 17a. The processor 11, the ROM 12a, the RAM 12b, the storage section 12c, the display section 13, the touch panel driver 14, the power source control section 16 and the communication control section 17 are connected via a bus 19 so that data can be mutually input/output.

The processor 11 is constructed by using, for example, a CPU (Central Processing Unit), an MPU (Micro Processing Unit), or a DSP (Digital Signal Processor), and comprehensively controls the input device 1 and performs other various arithmetic processing or control processing. The processor 11 reads programs and data stored in the ROM 12a, and performs various processing of each embodiment described later.

The ROM 12a stores an application program installed in the input device 1, and programs and data to be used when the processor 11 executes processing in various sections (described later) illustrated in FIG. 3. The RAM 12b works as a work memory to be used in the operation of each of the processor 11, the touch panel driver 14 and the communication control section 17.

The storage section 12c is constructed by using a hard disk or a flash memory built in the input device 1, and stores data acquired or generated by the input device 1. It is noted that the application program is stored in the storage section 12c to be read by the processor 11 in execution. Alternatively, the storage section 12c may be constructed by using, instead of a hard disk or a flash memory, an external storage medium (such as a USB memory) connected via, for example, a USB (Universal Serial Bus) terminal.

The display section 13 is constructed by using, for example, an LCD or an organic EL display, and displays, in a screen, data output from the processor 11 or the touch panel driver 14.

The touch panel driver 14 controls the operation of the touch panel 15 and monitors an input operation performed by a user on the touch panel 15. For example, if the touch panel 15 detects a touch by a touch operation or proximity by a hover operation performed on the operating surface with a user finger, the touch panel driver 14 obtains contact coordinates (x, y) or proximity coordinates (x, y, z), and outputs information of the contact coordinates (x, y) or the proximity coordinates (x, y, z) to the processor 11, the RAM 12b or the storage section 12c. Hereinafter, the contact coordinates (x, y) are designated as the "touch coordinates (x, y)".

The touch panel 15 is mounted on the screen of the display section 13, and detects a touch on the surface of the touch panel 15 with a user finger. Besides, the touch panel 15 detects proximity to the touch panel 15 of a finger due to a hover operation with a user finger, namely, in a state where a finger is held above the surface of the touch panel 15 without touching it.

Incidentally, as the structure of the touch panel 15 capable of detecting a proximity state necessary for practicing the present invention, the related art disclosed in Patent Document 1 can be directly utilized. Therefore, the description of the specific structure of the touch panel 15 is herein omitted. The touch panel 15 detects proximity (state) of a finger if the height of the finger (corresponding to the value of the z coordinate) in a hover operation is equal to or smaller than a prescribed value, or electrostatic capacity determined in accordance with the height of the finger is equal to or larger than a prescribed value.

The power source control section 16 is constructed by using a power source (such as a battery) for the input device 1, and turns on/off the power to the input device 1 in accordance with an input operation performed on the touch panel 15. When the power is in an on state, the power source control section 16 supplies power from the power source to the respective sections illustrated in FIG. 2 so as to place the input device 1 in an operable state.

The communication control section 17 is constructed by using a wireless communication circuit, and via the antenna 17a for transmission and receipt, it transmits data obtained as a result of processing performed by the processor 11 and further receives data transmitted from a base station or another communication terminal not shown. Besides, in FIG. 2, components necessary for describing each embodiment below including the present embodiment are illustrated, and the input device may employ a configuration further including a voice control section for controlling a voice call, a microphone for collecting a voice of a user, and a speaker for outputting voice data of a person on the line.

<Functional Configuration of Input Device Common to Embodiments>

Next, the functional configuration of the input device 1 common to the respective embodiments will be described with reference to FIG. 3. FIG. 3 is a block diagram illustrating the functional configuration of the input device 1.

The touch panel 15 of FIG. 2 includes a proximity detecting section 10 and a touch detecting section 20. The proximity detecting section 10 detects proximity of a user finger to the touch panel 15 due to a hover operation. The proximity detecting section 10 outputs, to a proximity coordinate extracting section 100, proximity information corresponding to proximity of a finger to the touch panel.

The touch detecting section 20 detects a touch with a finger on the touch panel 15 due to a touch operation. The touch detecting section 20 outputs, to a touch coordinate extracting section 200, touch information corresponding to a touch of a finger on the touch panel 15. Incidentally, the proximity detecting section 10 and the touch detecting section 20 can be constructed by using the touch panel 15, and although the proximity detecting section 10 and the touch detecting section 20 are separately provided in FIG. 3, they can be constructed together as the touch panel 15.

The touch panel driver 14 of FIG. 2 includes the proximity coordinate extracting section 100 and the touch coordinate extracting section 200. The proximity coordinate extracting section 100 extracts, by calculation, proximity coordinates (x, y, z) corresponding to the position of the finger on the touch panel 15 on the basis of the proximity information output from the proximity detecting section 10. The touch coordinate extracting section 200 extracts, by calculation, touch coordinates (x, y) on the basis of the touch information output from the touch detecting section 20.

In the proximity coordinates (x, y, z), the x component and the y component are coordinate values of a position on a plane parallel to the surface of the touch panel 15, and the z component is a coordinate value corresponding to a distance between the finger and the touch panel 15, namely, the height of the finger above the touch panel 15. The proximity coordinate extracting section 100 outputs information of the extracted proximity coordinates (x, y, z) to a sensor information acquiring section 51.

Besides, in the case where a plurality of fingers are simultaneously placed in a proximity state to the surface of the touch panel 15, the proximity coordinate extracting section 100 outputs, to the sensor information acquiring section 51, information of proximity coordinates corresponding to respective positions of the plural fingers.

Figure 3:
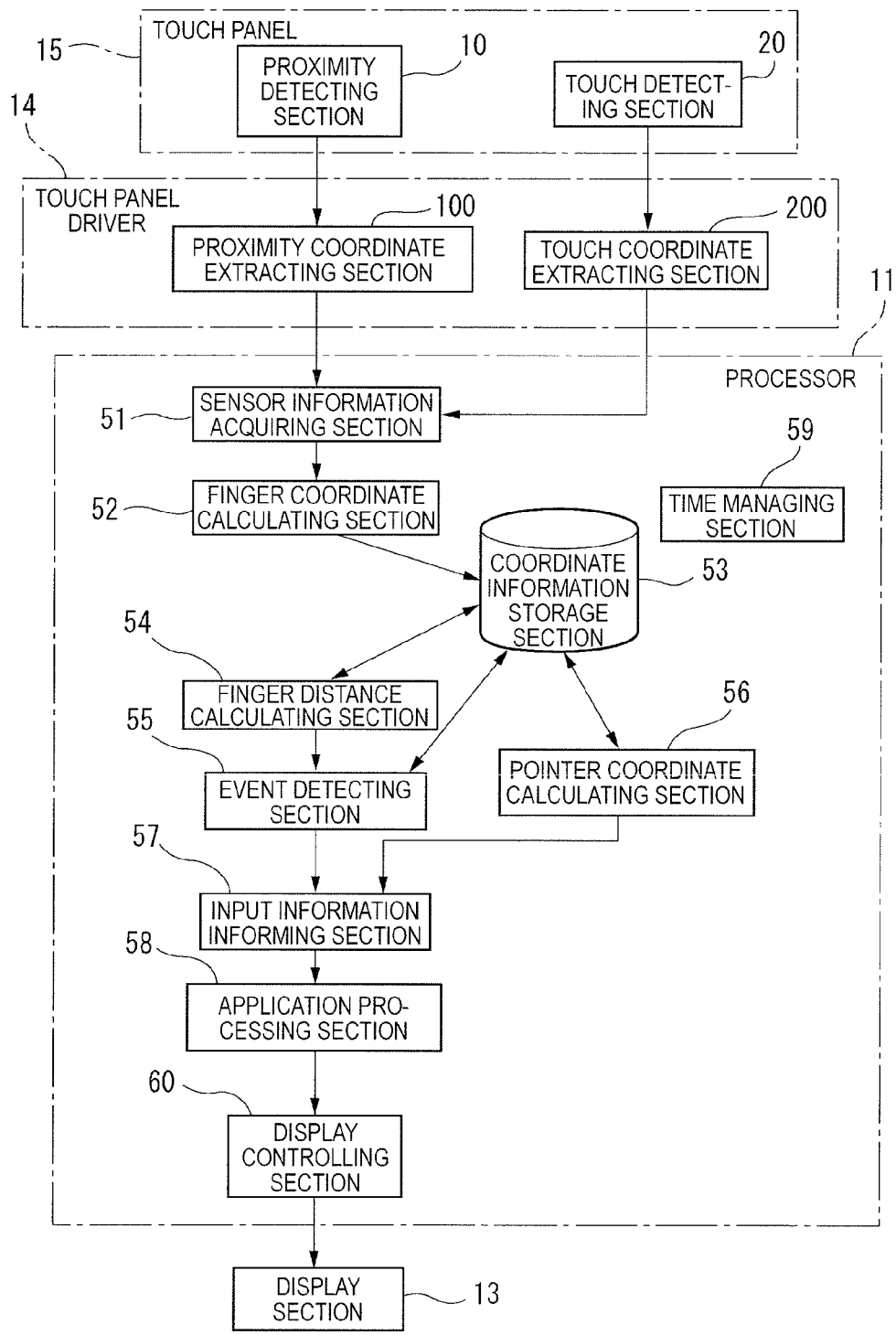
FIG. 3 is a block diagram illustrating an example of the functional configuration of the input device of FIG. 2.

The processor of FIG. 2 includes, as illustrated in FIG. 3, the sensor information acquiring section 51, a finger coordinate calculating section 52, a coordinate information storage section 53, a finger distance calculating section 54, an event detecting section 55, a pointer coordinate calculating section 56, an input information informing section 57, an application processing section 58, a time managing section 59 and a display controlling section 60.

The sensor information acquiring section 51 acquires information pertaining to the touch panel 15 when a prescribed condition precedently determined is satisfied. When, for example, a detection state of the proximity detecting section 10 has changed, the sensor information acquiring section 51 acquires, from the proximity coordinate extracting section 100, information of proximity coordinates of each finger in a proximity state in the latest state. Alternatively, when a detection state of the touch detecting section 20 has changed, the sensor information acquiring section 51 acquires, from the touch coordinate extracting section 200, data of contact coordinates of each finger in a contact state in the latest state.

The finger coordinate calculating section 52 stores the information of the proximity coordinates or contact coordinates of each finger having been acquired by the sensor information acquiring section 51 in the coordinate information storage section 53. Besides, if proximity coordinates or contact coordinates of a plurality of fingers are simultaneously extracted, the finger coordinate calculating section 52 stores the information of the proximity coordinates or contact coordinates of the plural fingers in association with one another correspondingly to each time point managed by the time managing section 59. Alternatively, if there is a difference, owing to a difference in, for example, resolution, between coordinates on the screen DP controlled by the processor 11 and coordinates on the touch panel 15, the finger coordinate calculating section 52 performs calculation for coordinate conversion as occasion demands.

Figure 4:
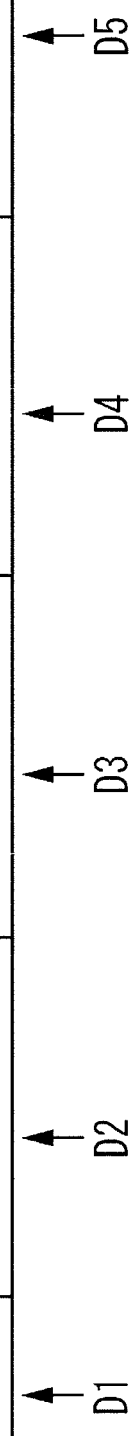
FIG. 4 is a schematic diagram illustrating a specific constitutional example of information stored in a coordinate information storage section.

The coordinate information storage section 53 temporarily stores the information of coordinates acquired up to the present time since a prescribed time ago in association with respective time points. For example, information illustrated in FIG. 4 is stored in the coordinate information storage section 53. The information stored in the coordinate information storage section 53 is added or updated by the finger coordinate calculating section 52, the finger distance calculating section 54 and the pointer coordinate calculating section 56. The information stored in the coordinate information storage section 53 is referred to if necessary.

When a plurality of fingers are simultaneously in a proximity state to the touch panel 15, the finger distance calculating section 54 calculates a distance between these plural fingers as a "finger distance". For example, if the two fingers F1 and F2 are in the proximity of the touch panel 15 as in state C1 of FIG. 1, the distance between the position P1 of the finger F1 and the position P2 of the finger F2 is calculated as the "finger distance". The information of the "finger distance" is stored in the coordinate information storage section 53.

The event detecting section 55 detects, when a prescribed detection condition is satisfied, a "determination event" corresponding to the acceptance of an operation of "determination" necessary for executing the aforementioned "prescribed processing". Specifically, when a plurality of fingers are simultaneously placed in a proximity state to the touch panel 15 and the "finger distance" between the fingers has become equal to or smaller than a prescribed value, the prescribed detection condition is satisfied, and hence, the event detecting section 55 detects the "determination event".

For example, if state C2 of FIG. 1 is changed to state C3, namely, if a user has moved the fingers F1 and F2 close to each other to bring them into contact with each other in a hover operation state, the "finger distance" between the position P1 and the position P2 is reduced, and the "determination event" is detected. Accordingly, in the input device 1, the "determination event" can be generated without a user bringing the finger F1 or F2 into contact with the operating surface of the touch panel 15.

The pointer coordinate calculating section 56 calculates pointer coordinates for specifying a position on the screen of a current operation target. If merely one finger is placed in a proximity state to the touch panel 15, the position of the finger is equivalent to the pointer coordinates. If a plurality of fingers are simultaneously placed in a proximity state, however, the pointer coordinate calculating section 56 calculates the pointer coordinates by calculation described below.

Specifically, if the two fingers F1 and F2 are placed in a proximity state to the surface of the touch panel 15 as in state C1 of FIG. 1, the pointer coordinate calculating section 56 calculates the position Pc of the middle point between the positions P1 and P2 of the fingers, and determines, as the pointer coordinates, coordinates of the position Pc2 obtained by projecting the position Pc onto the screen DP along the vertical axis to the touch panel 15. Thus, the input device 1 can allow the user to visually recognize, through gaps among the plural fingers, a portion of the pointer coordinates where an operation target (such as an icon) is present in the screen DP, and can make it easy to position the finger in the operation. The information of the pointer coordinates is stored in the coordinate information storage section 53.

The input information informing section 57 informs the application processing section 58 of the "determination event" when the event detecting section 55 detects the "determination event". Besides, when the pointer coordinates calculated by the pointer coordinate calculating section 56 have changed, the input information informing section 57 informs the application processing section 58 of new pointer coordinates.

The application processing section 58 performs processing pertaining to the application program on the basis of the "determination event" and the information of the pointer coordinates informed by the input information informing section 57. For example, if the "determination event" is generated when an icon or a hyperlink of a specific application program is allocated to the position of the current pointer coordinates in the screen DP of the display section 13, the application processing section 58 starts the application program corresponding to the "determination event".

Besides, if the "determination event" is generated when the pointer coordinates point at a portion with which a specific function of an already started application program is associated, the application processing section 58 executes the function corresponding to the "determination event". Alternatively, if the "determination event" is generated when the pointer coordinates point at an area in the screen where an icon of specific content is displayed, the application processing section 58 opens a data file of the content of the icon corresponding to the "determination event" by using a prescribed application for executing display or reproduction of data.

The time managing section 59 grasps the present time in the input device 1 and manages, for example, an elapsed time from a given time point if necessary.

The display controlling section 60 displays the pointer PT of FIG. 1 in the position of the latest pointer coordinates calculated by the pointer coordinate calculating section 56, and updates the display of the pointer PT in accordance with the change of the pointer coordinates. Besides, the display controlling section 60 displays a result of the processing of the application processing section 58 in the display section 13.

Incidentally, the various functions of the processor 11 illustrated in FIG. 3 can be incorporated into a basic program (an operating system) for controlling the input device 1 or incorporated into an individual application program. Alternatively, the functions may be realized as dedicated hardware.

<Specific Examples of Information to be Used>

FIG. 4 is a schematic diagram illustrating a specific constitutional example of the information stored in the coordinate information storage section 53. In the example of FIG. 4, information held in the coordinate information storage section 53 resulting from that a user has simultaneously placed two fingers in a proximity state to the plane of the touch panel 15 is shown.

In the example of FIG. 4, five types of information D1 to D5 are stored distinguishably depending on acquisition time points. The contents of the information D1 to D5 are as follows:

The information D1 is time information, and specifically corresponds to a time point at which the information was acquired, or relative elapsed time from a given time point. The information D2 is first finger coordinates, and specifically corresponds to coordinates (x1, y1, z1) of a first finger placed in a proximity state. The information D3 is second finger coordinates, and specifically corresponds to coordinates (x2, y2, z2) of a second finger placed in a proximity state. The information D4 is a finger distance, and specifically corresponds to a distance on the x-y plane between the first finger coordinates corresponding to the information D2 and the second finger coordinates corresponding to the information D3. Lastly, the information D5 is pointer coordinates, and specifically corresponds to coordinates corresponding to a middle point between the first finger coordinates corresponding to the information D2 and the second finger coordinates corresponding to the information D3.

The information D1, D2 and D3 at each time point shown in FIG. 4 are written by the finger coordinate calculating section 52. The information D4 is written by the finger distance calculating section 54. The information D5 is written by the pointer coordinate calculating section 56.

<Operation of Input Device 1>

<Embodiment 1 : Detection of Touch Operation with Plural Fingers>

Figure 5:
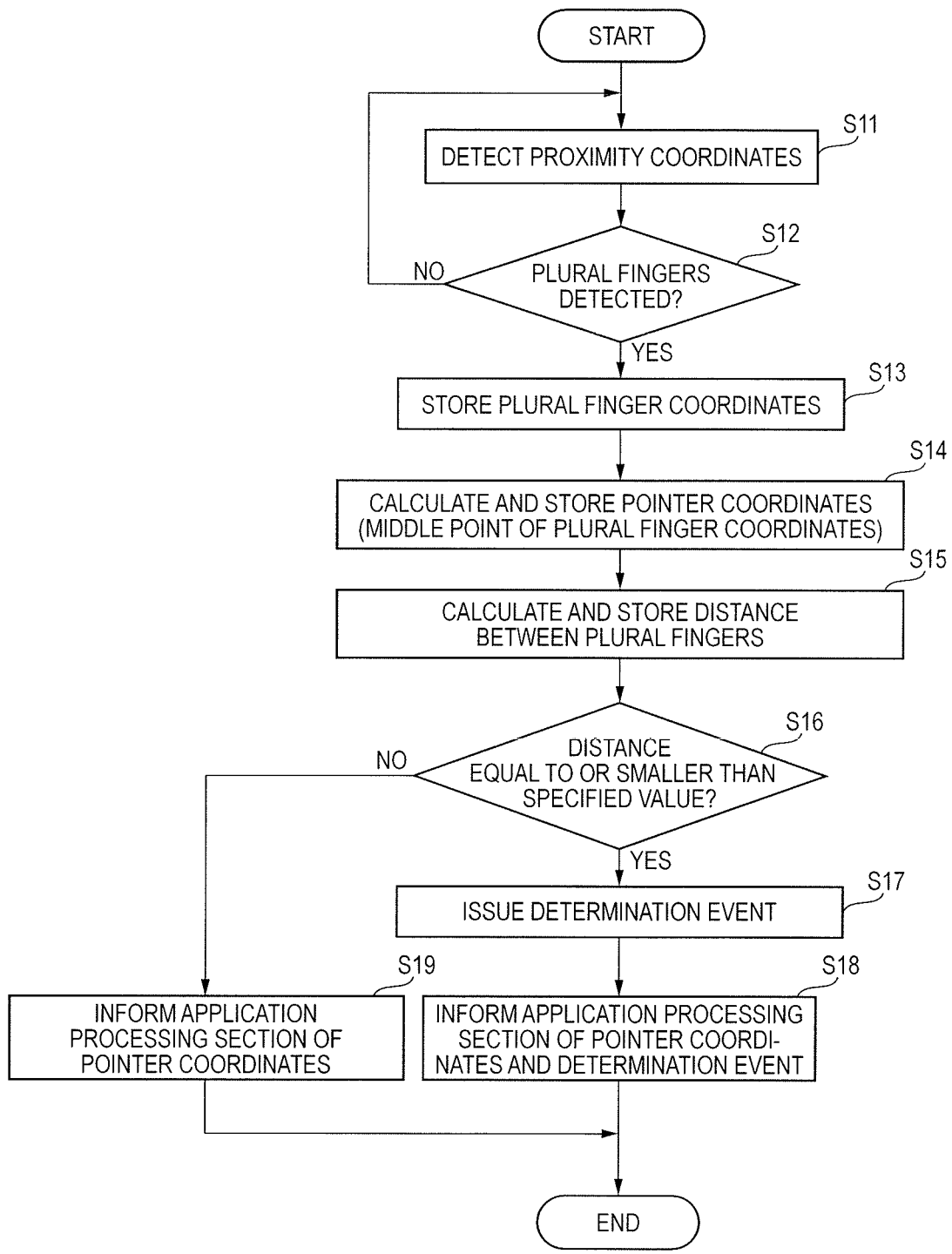
FIG. 5 is a flowchart illustrating an operation performed when the input device of FIG. 3 detects a touch operation with a plurality of fingers.

FIG. 5 is a flowchart illustrating an operation performed when the input device 1 of FIG. 3 detects a "touch operation with a plurality of fingers". Here, a "touch operation with a plurality of fingers" refers to an operation performed with the fingers F1 and F2 of a user in transition from state C2 to state C3 illustrated in FIG. 1. In other words, an operation in which a user moves a plurality of fingers F1 and F2, which are in the proximity of the operating surface of the touch panel 15, close to each other to bring them into contact with each other while retaining a hover operation state or in which a user reduces the "finger distance" to be smaller than a prescribed distance is a "touch operation with a plurality of fingers".

In FIG. 5, when a user holds his/her fingers close to the operating surface of the touch panel 15, the proximity detecting section 10 detects the proximity of the fingers (S11). The proximity coordinate extracting section 100 extracts, by calculation, proximate coordinates corresponding to the positions of the fingers in a proximity state on the basis of proximity information output from the proximity detecting section 10.

The sensor information acquiring section 51 acquires the information of the extracted proximity coordinates from the proximity coordinate extracting section 100, and discriminates whether or not the plural fingers are simultaneously in a proximity state (S12). If the plural fingers are not simultaneously in a proximity state (S12, NO), the operation of the input device 1 returns to step S11. If the plural fingers are simultaneously in a proximity state (S12, YES), the sensor information acquiring section 51 acquires information of proximity coordinates corresponding to a spatial position of each of the plural fingers in a proximity state.

Specifically, if the plural fingers are simultaneously detected to be in a proximity state, the finger coordinate calculating section 52 writes the information of plural proximity coordinates obtained from the sensor information acquiring section 51 in the coordinate information storage section 53 (S13). For example, if two fingers are in a proximity state, the finger coordinate calculating section 52 writes, in the coordinate information storage section 53, information D1 corresponding to the present time point, information D2 of first finger coordinates corresponding to the position of the first finger and information D3 of second finger coordinates corresponding to the position of the second finger as illustrated in FIG. 4 as the information of each time point.

When the plural fingers are simultaneously detected in a proximity state, the pointer coordinate calculating section 56 calculates pointer coordinates by referring to the coordinate information storage section 53, and writes the calculated pointer coordinates in the coordinate information storage section 53 as information D5 (S14). The pointer coordinates correspond to the position Pc2 obtained by projecting the coordinates of the middle point Pc between the positions of the plural fingers in a proximity state onto the screen DP along the vertical axis to the touch panel 15.

When the plural fingers are simultaneously detected in a proximity state, the finger distance calculating section 54 calculates a finger distance by referring to the coordinate information storage section 53, and writes the calculated finger distance in the coordinate information storage section 53 as information D4 (S15).

The event detecting section 55 discriminates whether or not the "finger distance" corresponding to the information D4 stored in the coordinate information storage section 53 at the latest time point (the present time point) is equal to or smaller than a prescribed value (specified value) Lth (S16). Here, the prescribed value (the specified value) Lth is a threshold value for discriminating whether or not the plural fingers are in contact with each other in the space away from the touch panel 15, and a precedently determined constant is used. If the "finger distance" is equal to or smaller than the prescribed value Lth, namely, if the plural fingers are detected to be in contact with each other in the space away from the touch panel 15, the event detecting section 55 issues a "determination event" (S17).

If the "finger distance" is equal to or smaller than the prescribed value Lth (S17, YES), namely, if the plural fingers are detected to be in contact with each other in the space away from the touch panel 15, the input information informing section 57 informs the application processing section 58 of the information of the pointer coordinates and the "determination event" (S18).

If the "finger distance" exceeds the prescribed value Lth, namely, if the plural fingers are not in contact with each other in the space away from the touch panel 15 (S17, NO), the input information informing section 57 informs the application processing section 58 of the pointer coordinates (S19).

In this manner, when the plural fingers are brought into contact with each other in the space away from the touch panel 15 as in state C3 of FIG. 1, the input device 1 of Embodiment 1 can perform the "determination" operation for causing the prescribed processing to be executed by passing the "determination event" to the application processing section 58.

Thus, in the input device 1, when a user reduces the finger distance between the plural fingers, a determination event can be definitely generated for performing an input operation for determination merely by a simple finger operation without the user touching the touch panel. Besides, since an input operation for determination can be easily performed with fingers placed in the space away from the touch panel 15 in the input device 1, the screen can be prevented from becoming dirty with fingerprints.

Besides, if the plural fingers move parallel without coming into contact with each other in the space away from the touch panel 15 as in state C2 of FIG. 1, the pointer coordinates to be passed to the application processing section 58 may be successively updated, so as to move the display position of the pointer PT.

<Embodiment 2:Detection of Tap Operation with Plural Fingers>

Figure 6:
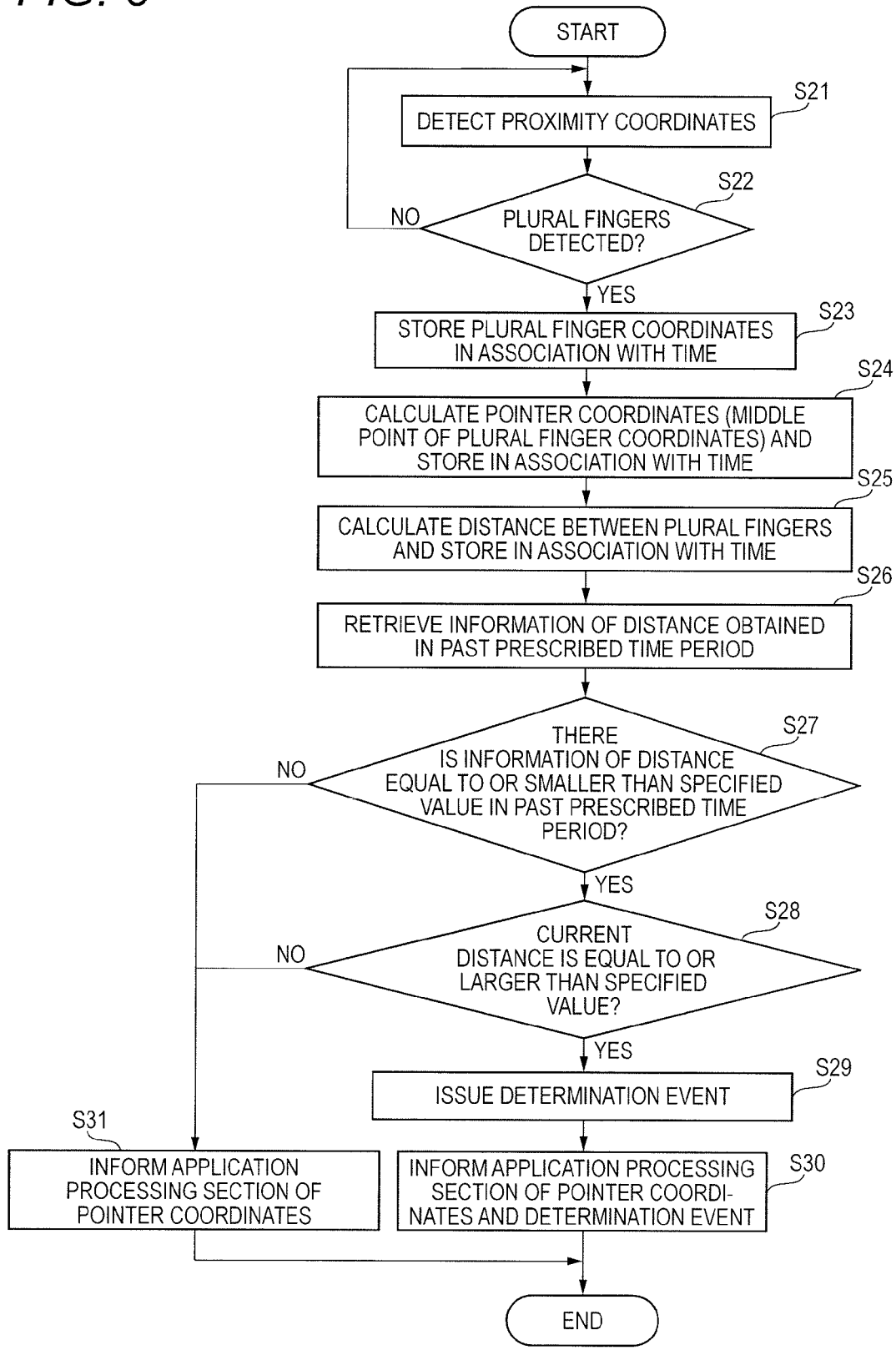
FIG. 6 is a flowchart illustrating an operation performed when the input device of FIG. 3 detects a tap operation with a plurality of fingers.

FIG. 6 is a flowchart illustrating an operation performed when the input device 1 of FIG. 3 detects a "tap operation with a plurality of fingers". Here, a "tap operation with a plurality of fingers" refers to an operation performed with fingers of a user in which the fingers F1 and F2 in contact with each other are immediately detached from each other again after transition from state C2 to state C3 of FIG. 1. In other words, an operation in which a user moves a plurality of fingers F1 and F2, which are in the proximity of the operating surface of the touch panel 15, close to each other to bring them into contact with each other momentarily while keeping a hover operation state and immediately detaches the fingers away from each other is a "tap operation with a plurality of fingers".

In FIG. 6, when a user holds his/her fingers close to the operating surface of the touch panel 15, the proximity detecting section 10 detects proximity of the fingers (S21). The proximity coordinate extracting section 100 extracts, by calculation, proximity coordinates corresponding to the positions of the fingers in a proximity state on the basis of proximity information output from the proximity detecting section 10.

The sensor information acquiring section 51 acquires information of the extracted proximity coordinates from the proximity coordinate extracting section 100, and discriminates whether or not a plurality of fingers are simultaneously in a proximity state (S22). If a plurality of fingers are not simultaneously in a proximity state (S22, NO), the operation of the input device 1 returns to step S11. If a plurality of fingers are simultaneously in a proximity state (S22, YES), the sensor information acquiring section 51 acquires information of proximity coordinates corresponding to a position of each of the plural fingers in a proximity state.

Specifically, if a plurality of fingers are simultaneously detected in a proximity state, the finger coordinate calculating section 52 writes information of a plurality of proximity coordinates obtained from the sensor information acquiring section 51 in the coordinate information storage section 53 (S23). Here, the information written by the finger coordinate calculating section 52 is stored in the coordinate information storage section 53 in association with a time point of detecting or a time point of acquiring the proximity coordinates so that change with time of the proximity coordinates can be grasped.

For example, if two fingers are placed in a proximity state, the finger coordinate calculating section 52 writes, in the coordinate information storage section 53, information D1 corresponding to the present time point, information D2 of first finger coordinates corresponding to the position of a first finger, and information D3 of second finger coordinates corresponding to the position of a second finger as the information at each time point illustrated in FIG. 4.

When the plural fingers are simultaneously detected in a proximity state, the pointer coordinate calculating section 56 calculates pointer coordinates by referring to the coordinate information storage section 53, and writes the calculated pointer coordinates in the coordinate information storage section 53 as information D5 (S24). The pointer coordinates correspond to the position Pc2 obtained by projecting the coordinates of the middle point Pc between the positions of the plural fingers in a proximity state onto the screen DP along the vertical axis to the touch panel 15. Besides, the pointer coordinate calculating section 56 stores the calculated pointer coordinates in the coordinate information storage section 53 in association with a time point.

When the plural fingers are simultaneously detected in a proximity state, the finger distance calculating section 54 calculates a finger distance by referring to the coordinate information storage section 53, and writes the calculated finger distance in the coordinate information storage section 53 as information D4 (S25). Besides, the finger distance calculating section 54 stores the calculated finger distance in the coordinate information storage section 53 in association with a time point.

The event detecting section 55 retrieves, in the information stored in the coordinate information storage section 53, the information D4 of all the "finger distances" obtained within a prescribed time period from the present to the past, namely, within a range from the present to a prescribed time ago (S26), and discriminates whether or not there are one or more finger distances of the information D4 equal to or smaller than the prescribed value Lth (S27).

If there are one or more "finger distances" of the information D4 equal to or smaller than the prescribed value Lth (S27, YES), the event detecting section 55 refers to the information D4 of the "finger distance" of the information D1 of the latest time point (namely, the present time), and discriminates whether or not this "finger distance" is equal to or larger than the prescribed value Lth (S28).

If the conditions of both step S27 and step S28 are satisfied, namely, if the finger distance between the plural fingers have been in a contact state within the past prescribed time period and the finger distance between the plural fingers in a proximity state are now in a non-contact state (S27—YES, S28—YES), it is determined that the "tap operation with a plurality of fingers" has been performed, and the event detecting section 55 issues a "determination event" (S29).

If the conditions of both step S27 and step S28 are satisfied, the input information informing section 57 informs the application processing section 58 of the pointer coordinates and the "determination event" (S30).

If the condition of step S27 or step S28 is not satisfied (S27—NO or S28—NO), the input information informing section 57 informs the application processing section 58 of the pointer coordinates (S31).

In this manner, if a plurality of fingers have come into contact with each other in a space away from the touch panel 15 and have immediately detached from each other as in state C3 of FIG. 1, the input device 1 of Embodiment 2 can perform a determination operation for causing the prescribed processing to be executed by passing the "determination event" to the application processing section 58.

<Embodiment 3:Case of Differently Performing Plural Types of Operations>

Figure 7:
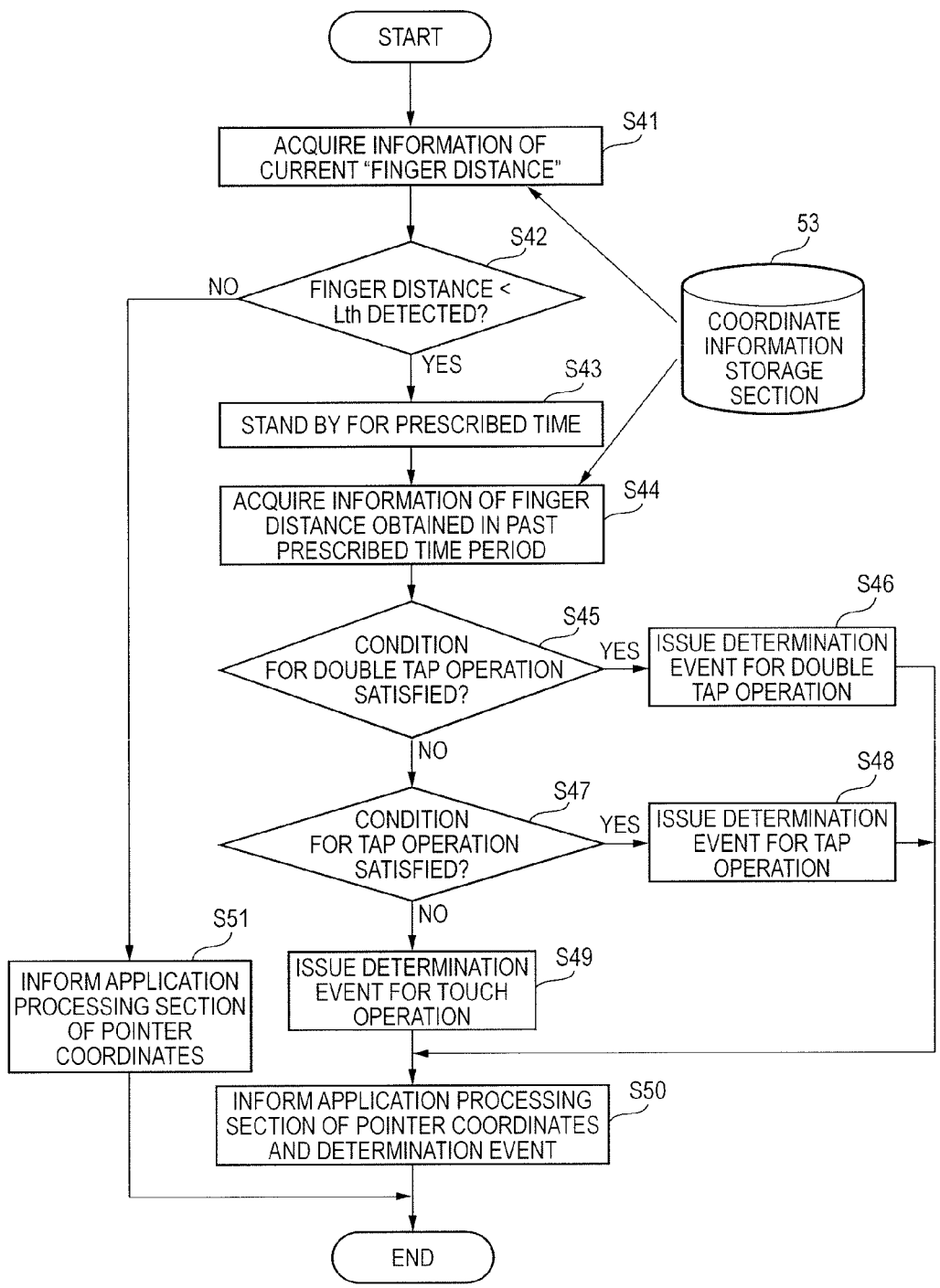
FIG. 7 is a flowchart illustrating an operation performed when the input device of FIG. 3 discriminates a type of operation performed with two fingers.

FIG. 7 is a flowchart illustrating an operation performed when the input device 1 of FIG. 3 discriminates the type of operation with two fingers. Incidentally, although the operations of the sensor information acquiring section 51, the finger coordinate calculating section 52, the finger distance calculating section 54 and the pointer coordinate calculating section 56 of FIG. 6, namely, the operations performed in step S21 to step S25, are omitted in FIG. 7, operations similar to those of steps S21 to step S25 of FIG. 6 are performed before an operation of step S41 of FIG. 7.

In FIG. 7, if a plurality of fingers are simultaneously detected in a proximity state, the event detecting section 55 acquires the information D4 of the "finger distance" in association with the information D1 of the latest (newest or present) time point by referring to the content of the coordinate information storage section 53 (S41). The event detecting section 55 compares the acquired "finger distance" with the prescribed value Lth (S42). If a condition of "finger distance<prescribed value Lth" is satisfied, the operation of the input device 1 proceeds to step S43. If the condition of "finger distance<prescribed value Lth" is not satisfied, the operation of the input device 1 proceeds to step S51.

Specifically, if a plurality of fingers are detected to be in contact with each other in the space away from the touch panel 15, the operation of the input device 1 proceeds to step S43, and the event detecting section 55 stands by for a prescribed time period (of, for example, 1 second) (S43). Thereafter, the operation of the input device 1 proceeds to step S44. Besides, also while the event detecting section 55 is standing by in step S43, newly acquired information is successively written in the coordinate information storage section 53.

After completing the stand-by of step S43, the event detecting section 55 acquires, from the information stored in the coordinate information storage section 53, the information D4 of all the "finger distances" obtained within a prescribed time period from the present to the past, namely, within a range from the present to a prescribed time ago, so as to grasp the change with time of the "finger distance" (S44).

The event detecting section 55 discriminates several types of operations performed with a plurality of fingers by comparing the change with time of the "finger distance" grasped in step S44 with precedently determined operation conditions (S45 to S49). The several types of operations performed with a plurality of fingers refer to, for example, three types of operations of a "double tap operation with two fingers", a "tap operation with two fingers", and a "touch operation with two fingers".

An operation condition for the "double tap operation with two fingers" is that two fingers come into contact with each other twice within a prescribed time period, namely, a state where the "finger distance" between the two fingers is equal to or smaller than the prescribed value Lth occurs continuously twice, and then the two fingers are detached from each other. An operation condition for a "two-finger tap operation" is that two fingers come into contact with each other once within a prescribed time period, namely, a state where the "finger distance" between two fingers is equal to or smaller than the prescribed value Lth occurs once, and then the two fingers are detached from each other. An operation condition for a "two-finger touch operation" is that two fingers come into contact with each other.

The event detecting section 55 discriminates whether or not the operation condition for the "double tap operation with two fingers" is satisfied (S45). If the operation condition for the "double tap operation with two fingers" is satisfied (S45, YES), the event detecting section 55 issues a "determination event" together with the type, that is, the "double tap operation with two fingers" (S46).

If the operation condition for the "double tap operation with two fingers" is not satisfied (S45, NO), the event detecting section 55 discriminates whether or not the operation condition for the "tap operation with two fingers" is satisfied (S47). If the operation condition for the "tap operation with two fingers" is satisfied (S47, YES), the event detecting section 55 issues a "determination event" together with the type, that is, the "tap operation with two fingers" (S48).

If the operation condition for neither the "double tap operation with two fingers" nor the "tap operation with two fingers" is satisfied (S47, NO), the event detecting section 55 issues a "determination event" together with the type, that is, the "touch operation with two fingers" (S49).

After the event detecting section 55 issues the "determination event", the input information informing section 57 informs the application processing section 58 of the pointer coordinates and the "determination event" (S50). The "determination event" informed by the input information informing section 57 includes information for distinguishing the type of the event, namely, the three types of the "double tap operation with two fingers", the "tap operation with two fingers" and the "touch operation with two fingers".

In step S42, if the condition of "finger distance<prescribed value Lth" is not satisfied, the input information informing section 57 informs the application processing section 58 of the pointer coordinates (S51).

In this manner, the input device 1 of Embodiment 3 can allocate execution of different processing in accordance with the three types of operations of the "double tap operation with two fingers", the "tap operation with two fingers" and the "touch operation with two fingers" when a user performs a "determination" operation for executing processing on an operation target specified by the pointer coordinates.

Thus, in the input device 1, a plurality of different types of events can be generated merely by a user moving a plurality of fingers, and a plurality of types of processing can be executed as occasion demands by differently performing the respective types of operations.

Besides, the input device 1 can easily discriminate two types or three types of input operations in accordance with a difference in simple operations performed with two fingers by a user.

<Embodiment 4:First operation example for differently performing types of operations with three fingers>

In the aforementioned embodiment, an operation performed with two fingers disposed in a proximity state to the operating surface of the touch panel 15 is assumed, and an operation simultaneously using three fingers in a proximity state may be assumed instead.

<Determination of Pointer Coordinates>

Figure 11:
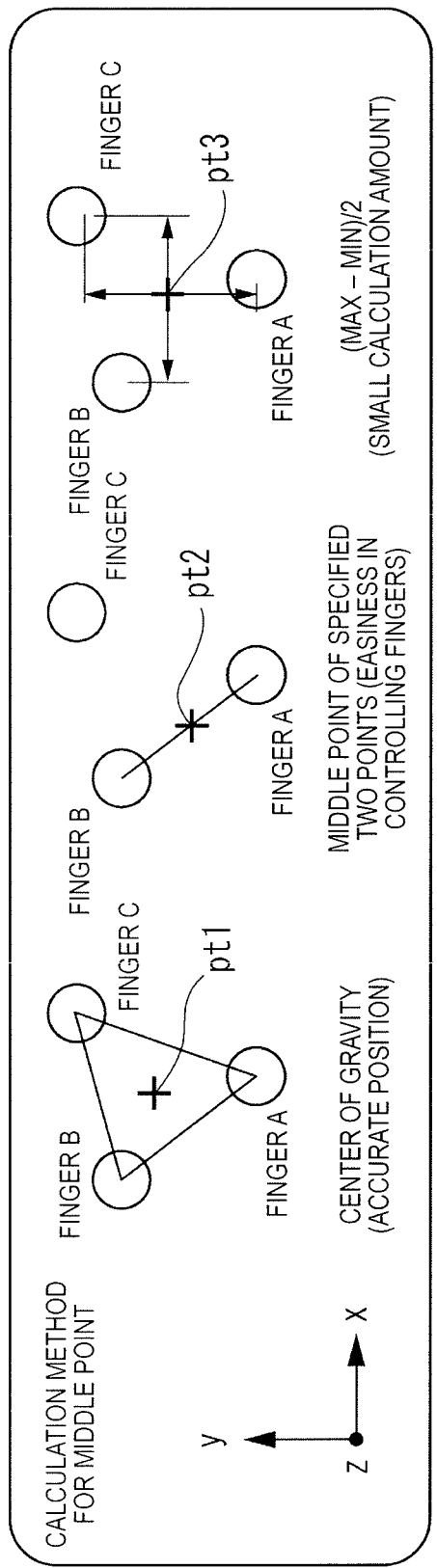
FIG. 11 is an explanatory diagram illustrating a specific example of the relationship between a combination of fingers on a x-y plane and pointer coordinates employed when the input device of FIG. 3 discriminates an operation with three fingers.

If three fingers are used, a plurality of methods can be presumed as a method for determining pointer coordinates. FIG. 11 is an explanatory diagram illustrating a specific example of the relationship between a combination of fingers on the x-y plane and pointer coordinates employed when the input device 1 of FIG. 3 discriminates an operation with three fingers.

In the example illustrated in FIG. 11, in the case where there are three fingers (a finger A, a finger B and a finger C) detected in a hover operation state, namely, a proximity state, it is assumed that three types of pointer coordinates pt1, pt2 and p3 are to be obtained. Incidentally, for simplifying the description, assuming a representative example in which a hand of a user used for the operation is a right hand, the "finger A" corresponds to a thumb, the "finger B" corresponds to a forefinger and the "finger C" corresponds to a middle finger. In the example illustrated in FIG. 11, however, the "finger A", the "finger B" and the "finger C" are not limited to correspond to the thumb, the forefinger and the middle finger, respectively.

Pointer coordinates pt1 of FIG. 11 are calculated as the center of gravity among three points, that is, the position of the "finger A", the position of the "finger B" and the position of the "finger C". When the pointer coordinates pt1 are used, the pointer PT can be accurately positioned.

Pointer coordinates pt2 of FIG. 11 are calculated, with two fingers of the "finger A" and the "finger B" precedently specified in "the finger A, the finger B and the finger C", as a middle point between the position of the selected "finger A" and the position of the selected "finger B". When the pointer coordinates pt2 are used, a user can easily control the plural fingers.

Pointer coordinates pt3 of FIG. 11 are calculated, by obtaining the maximum value and the minimum value of coordinate values on each of the x-axis and the y-axis from the position coordinates of the three points of the "finger A", the "finger B" and the "finger C", and calculated as {(maximum value−minimum value)/2}. When the pointer coordinates pt3 are used, the calculation amount of the input device 1 can be reduced.

<Types of Operations>

Figure 12:
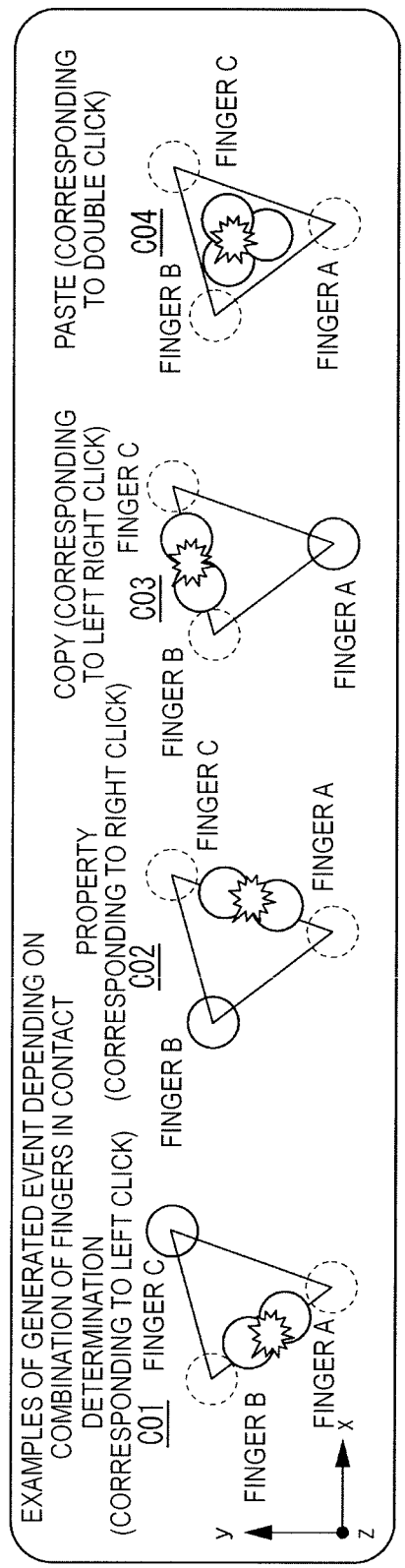
FIG. 12 is an explanatory diagram illustrating a specific example of the relationship between a combination of fingers on a x-y plane and a type of generated event employed when the input device of FIG. 3 discriminates an operation with three fingers.

FIG. 12 is an explanatory diagram illustrating a specific example of the relationship between a combination of fingers on the x-y plane and the type of generated event employed when the input device 1 of FIG. 3 discriminates an operation performed with three fingers.

In the example of FIG. 12, in the case where there are three fingers (a finger A, a finger B and a finger C) detected in a hover operation state, namely, in a proximity state, it is assumed that the type of event to be generated is specified by operating a finger distance among these fingers.

As in a combination CO1 illustrated on the left end in FIG. 12, if a finger distance between the "finger A" and the "finger B" out of the three fingers of the "finger A", the "finger B" and the "finger C" is reduced to bring the "finger A" and the "finger B" into contact with each other, the input device 1 generates a "first event". The "first event" corresponds to, for example, a "determination event", and is presumed to be performed as an event similar to a "left click" operation or a "left double click" operation in operating a mouse.

Besides, as in a combination CO2 illustrated on the second from the left in FIG. 12, if a finger distance between the "finger A" and the "finger C" out of the three fingers of the "finger A", the "finger B" and the "finger C" is reduced to bring the "finger A" and the "finger C" into contact with each other, the input device 1 generates a "second event". The "second event" is presumed to be performed as, for example, an event for changing the property (attribute) of an object of a specific operation target (such as an icon of a file of content) specified by the pointer coordinates. In other words, the "second event" can be dealt with as an event similar to a "right click" operation in operating a mouse.

Furthermore, as in a combination CO3 illustrated on the third from the left in FIG. 12, if a finger distance between the "finger B" and the "finger C" out of the three fingers of the "finger A", the "finger B" and the "finger C" is reduced to bring the "finger B" and the "finger C" into contact with each other, the input device 1 generates a "third event". The "third event" is presumed to be performed as, for example, an event for copying an object of a specific operation target (such as an icon of a file of content) specified by the pointer coordinates. In other words, the "third event" can be dealt with as an event similar to a "left right click" operation in operating a mouse.

Moreover, as in a combination CO4 illustrated on the right end in FIG. 12, if a finger distance among the three fingers of the "finger A", the "finger B" and the "finger C" is reduced to bring the "finger A", the "finger B" and the "finger C" into contact with one another, the input device 1 generates a "fourth event". The "fourth event" is presumed to be performed as, for example, an event for pasting (sticking) a precedently copied object (such as an icon of a file of content) in a position specified by the pointer coordinates. In other words, the "fourth event" can be dealt with as an event similar to a "double click" operation in operating a mouse.

In this manner, in the input device 1, a user can simply switch the type of event by changing the combination of a plurality of fingers to be brought into contact with each other by reducing a finger distance therebetween.

<Operation of Input Device>

Figure 8:
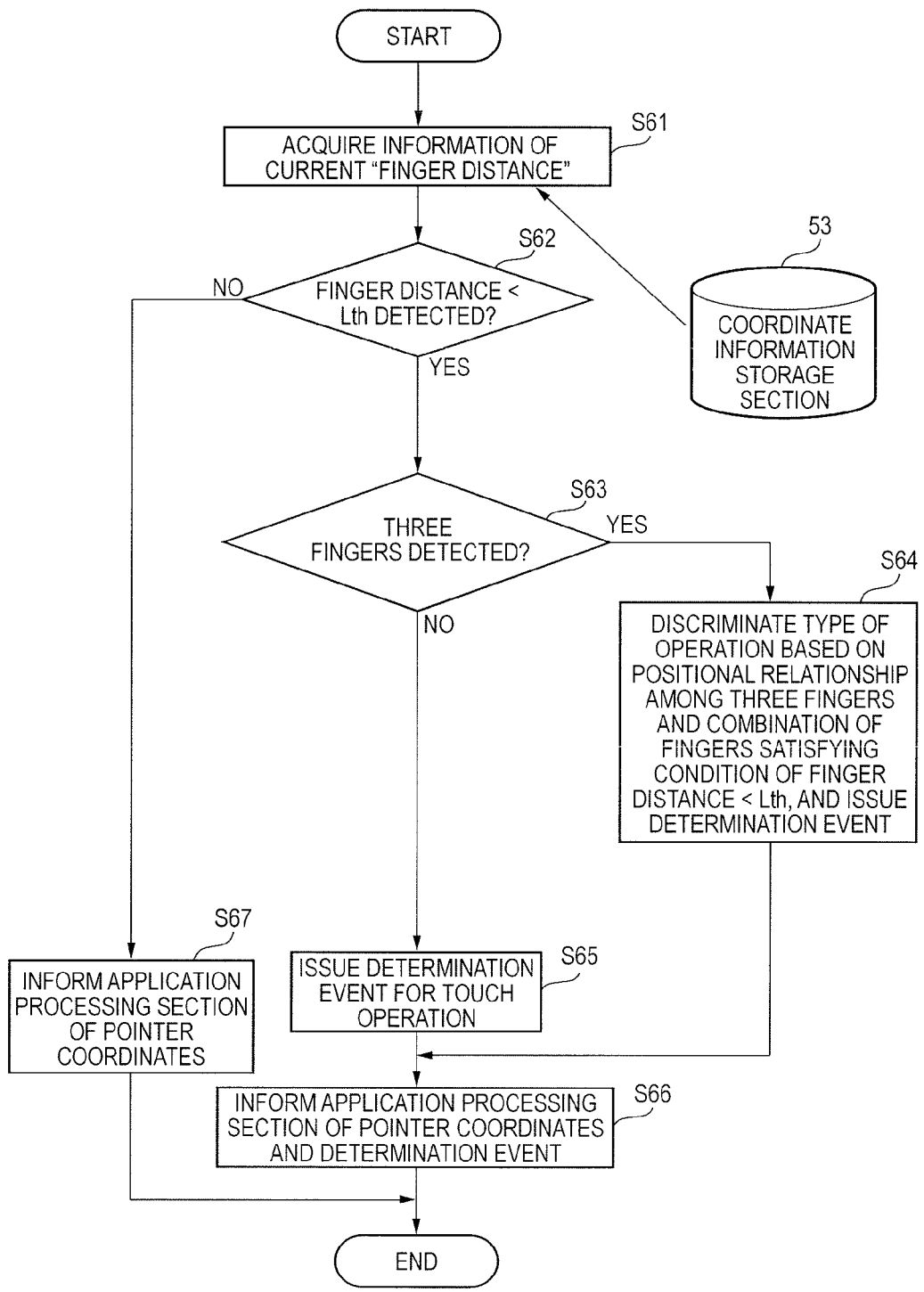
FIG. 8 is a flowchart illustrating a first operation example performed when the input device of FIG. 3 discriminates a type of operation performed with three fingers.

FIG. 8 is a flowchart illustrating a first operation example performed when the input device 1 of FIG. 3 discriminates the type of operation with three fingers. Incidentally, although the operations of the sensor information acquiring section 51, the finger coordinate calculating section 52, the finger distance calculating section 54 and the pointer coordinate calculating section 56 of FIG. 6, namely, the operations of step S21 to step S25, are omitted in FIG. 8, operations similar to those of step S21 to step S25 of FIG. 6 are performed before an operation of step S51 of FIG. 8.

In FIG. 8, when a plurality of fingers are simultaneously detected in a proximity state, the event detecting section 55 acquires the information D4 of the "finger distance" in association with the information D1 of the latest (newest or present) time point by referring to the content of the coordinate information storage section 53 (S61). The event detecting section 55 compares the acquired "finger distance" with the prescribed value Lth (S62). If the condition of "finger distance<prescribed value Lth" is satisfied, the operation of the input device 1 proceeds to step S63. If the condition of "finger distance<prescribed value Lth" is not satisfied, the operation of the input device 1 proceeds to step S67.

Incidentally, if the number of fingers in a proximity state is three or more, the finger coordinate calculating section 52 stores the minimum finger distance, out of a plurality of finger distances, as the information D4 of the "finger distance" in the coordinate information storage section 53.

On the basis of the information held in the coordinate information storage section 53, the event detecting section 55 discriminates whether or not the number of fingers detected as a proximity state is three (S63). If three fingers are detected, the operation of the input device 1 proceeds to step S64, and if, for example, merely two fingers are detected, it proceeds to step S65.

In step S64, the event detecting section 55 discriminates the type of operation as illustrated in FIG. 12 on the basis of the positional relationship among the three fingers and a combination of fingers satisfying the condition of "finger distance<prescribed value Lth", and issues a "determination event" including the type of operation (S64). Incidentally, a prescribed table of data corresponding to the positional relationship among the three fingers illustrated in FIG. 12, and the relationship between a combination of fingers satisfying the condition of "finger distance<prescribed value Lth" and each type of operation is precedently stored in the storage section 12c of the input device 1. The event detecting section 55 discriminates the type of operation performed with the three fingers on the basis of the prescribed table.

Besides, if merely two fingers are detected, the event detecting section 55 issues a "determination event" together with the type, for example, the "touch operation with two fingers" (S65).

If the event detecting section 55 issues the "determination event", the input information informing section 57 informs the application processing section 58 of the pointer coordinates and the "determination event" (S66). The "determination event" informed by the input information informing section 57 includes information for distinguishing the type of event, namely, the "first event", the "second event", the "third event" or the "fourth event" with three fingers, or the "touch operation with two fingers".

In step S62, if the condition of "finger distance<prescribed value Lth" is not satisfied, the input information informing section 57 informs the application processing section 58 of the pointer coordinates (S67).

<Embodiment 5: Second operation example for differently performing types of operations with three fingers>

Although the case where a finger distance between two or three fingers out of three fingers is reduced to bring them into contact with each other merely once is assumed in the example of FIG. 12, a combination of fingers to be brought into contact with each other may be successively changed for the operation. In this case, the type of event to be generated can be switched in accordance with a difference in the order of changing the combination. The operation of the input device performed in this case will now be described.

Figure 9:
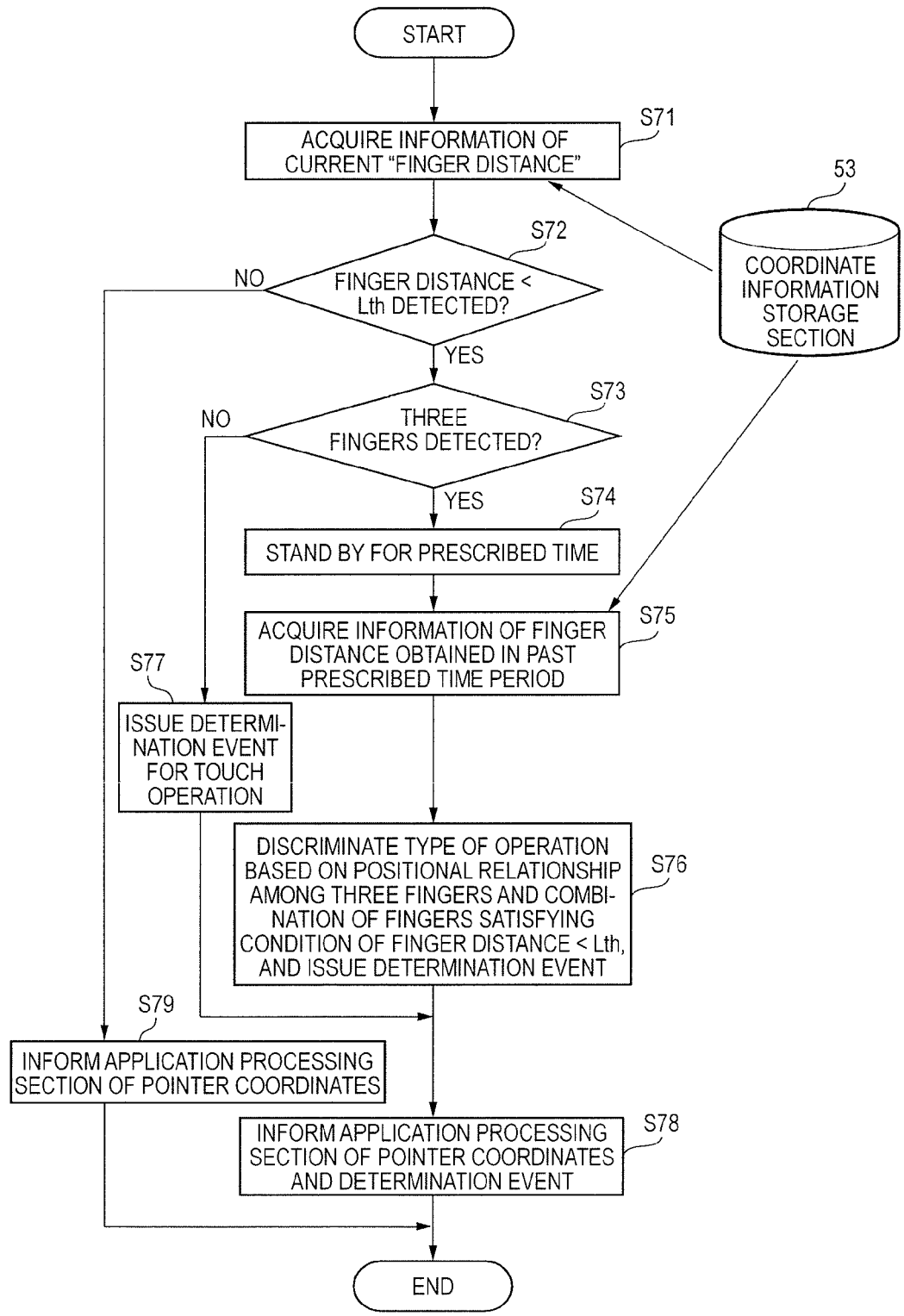
FIG. 9 is a flowchart illustrating a second operation example performed when the input device of FIG. 3 discriminates a type of operation performed with three fingers.

FIG. 9 is a flowchart illustrating a second operation example performed when the input device 1 of FIG. 3 discriminates the type of operation with three fingers. Incidentally, although the operations of the sensor information acquiring section 51, the finger coordinate calculating section 52, the finger distance calculating section 54 and the pointer coordinate calculating section 56 of FIG. 6, namely, the operations of step S21 to step S25, are omitted in FIG. 8, operations similar to those of step S21 to step S25 of FIG. 6 are performed before an operation of step S51 of FIG. 9.

In FIG. 9, when a plurality of fingers are simultaneously detected in a proximity state, the event detecting section 55 acquires the information D4 of the "finger distance" in association with the information D1 of the latest (newest or present) time point by referring to the content of the coordinate information storage section 53 (S71). The event detecting section 55 compares the acquired "finger distance" with the prescribed value Lth (S72). If the condition of "finger distance<prescribed value Lth" is satisfied, the operation of the input device 1 proceeds to step S73. If the condition of "finger distance<prescribed value Lth" is not satisfied, the operation of the input device 1 proceeds to step S79.

On the basis of the information held in the coordinate information storage section 53, the event detecting section 55 discriminates whether or not the number of fingers detected in a proximity state is three (S73). If three fingers are detected, the operation of the input device 1 proceeds to step S74, and if merely two fingers are detected, it proceeds to step S77.

If three fingers are simultaneously detected to come into contact with one another in the space away from the touch panel 15, the event detecting section 55 stands by for a prescribed time period (of, for example, 1 second) (S74). Thereafter, the operation of the input device 1 proceeds to step S75. Besides, also while the event detecting section 55 is standing by in step S74, newly acquired information is successively written in the coordinate information storage section 53. Furthermore, if the number of fingers in a proximity state is three, three finger distances are stored as the information D4 of the "finger distance" in the coordinate information storage section 53. Specifically, a first finger distance corresponding to a distance between a first finger and a second finger, a second finger distance between the first finger and a third finger, and a third finger distance between the second finger and the third finger are present as the information D4.

After completing the stand-by in step S74, the event detecting section 55 acquires, from the information stored in the coordinate information storage section 53, the information D4 of all the "finger distances" obtained within a prescribed period of time from the present to the past, namely, within a range from the present to a prescribed time ago, so as to grasp the change with time of the "finger distance" (S75).

The event detecting section 55 discriminates several types of operations by comparing the change with time of the "finger distance" grasped in step S75 with precedently determined operation conditions. Specifically, in accordance with the difference in the order of bringing the three fingers into contact with one another, the following different operations are discriminated.

"First operation with three fingers": After bringing the "finger A" and the "finger B" into contact with each other as in the combination CO1 of FIG. 12, the "finger C" is further brought into contact with them as in the combination CO4 of the same drawing.

"Second operation with three fingers": After bringing the "finger A" and the "finger C" into contact with each other as in the combination CO2 of FIG. 12, the "finger B" is further brought into contact with them as in the combination CO4 of the same drawing.

"Third operation with three fingers": After bringing the "finger A" and the "finger B" into contact with each other as in the combination CO1 of FIG. 12, the "finger A" and the "finger C" are brought into contact with each other as in the combination CO2 of the same drawing.

"Fourth operation with three fingers": After bringing the "finger A" and the "finger C" into contact with each other as in the combination CO2 of FIG. 12, the "finger A" and the "finger B" are brought into contact with each other as in the combination CO1 of the same drawing.

The event detecting section 55 discriminates whether or not each of the conditions of the "first operation with three fingers", the "second operation with three fingers", the "third operation with three fingers" and the "fourth operation with three fingers" is satisfied, and issues the "determination event" together with information corresponding the type of operation (S76).

Besides, if merely two fingers are detected, the event detecting section 55 issues the "determination event" together with the type, for example, the "touch operation with two fingers" (S77).

If the event detecting section 55 issues the "determination event", the input information informing section 57 informs the application processing section 58 of the pointer coordinates and the "determination event" (S78). The "determination event" informed by the input information informing section 57 includes information of the type of event, namely, information for distinguishing the five types of operations of the "first operation with three fingers", the "second operation with three fingers", the "third operation with three fingers", the "fourth operation with three fingers" and the "touch operation with two fingers".

If the condition of "finger distance<prescribed value Lth" is not satisfied in step S72, the input information informing section 57 informs the application processing section 58 of the pointer coordinates (S79).

In this manner, when a user performs the "determination" operation for executing processing on an operation target specified by the pointer coordinates, the input device 1 of Embodiment 4 or 5 can execute the processing in accordance with the "first operation with three fingers", the "second operation with three fingers", the "third operation with three fingers" or the "fourth operation with three fingers" depending on the combination of fingers used for the operation or the difference in the order of bringing the combined fingers used for the operation into contact with each other.

Thus, a user can simply perform a plurality of types of input operations in the input device 1 depending on merely a simple difference in the operation performed with three fingers.

<Usage of Focus>

In the aforementioned embodiments, an object corresponding to an operation target (such as an icon) or an area on the object is specified by a position (point) in the screen pointed by the pointer PT as illustrated in FIG. 1. Instead of this pointer PT, focus can be used.

The focus means an area currently selected in a screen. An area having the focus may be an area in an arbitrary shape having a given size, or a display area of each of various objects actually present in the screen DP. In using the pointer PT, a point specified by the pointer PT continuously moves in accordance with the movement of the pointer coordinates, but in using the focus, a selected area discretely moves in some cases.

Figure 10:
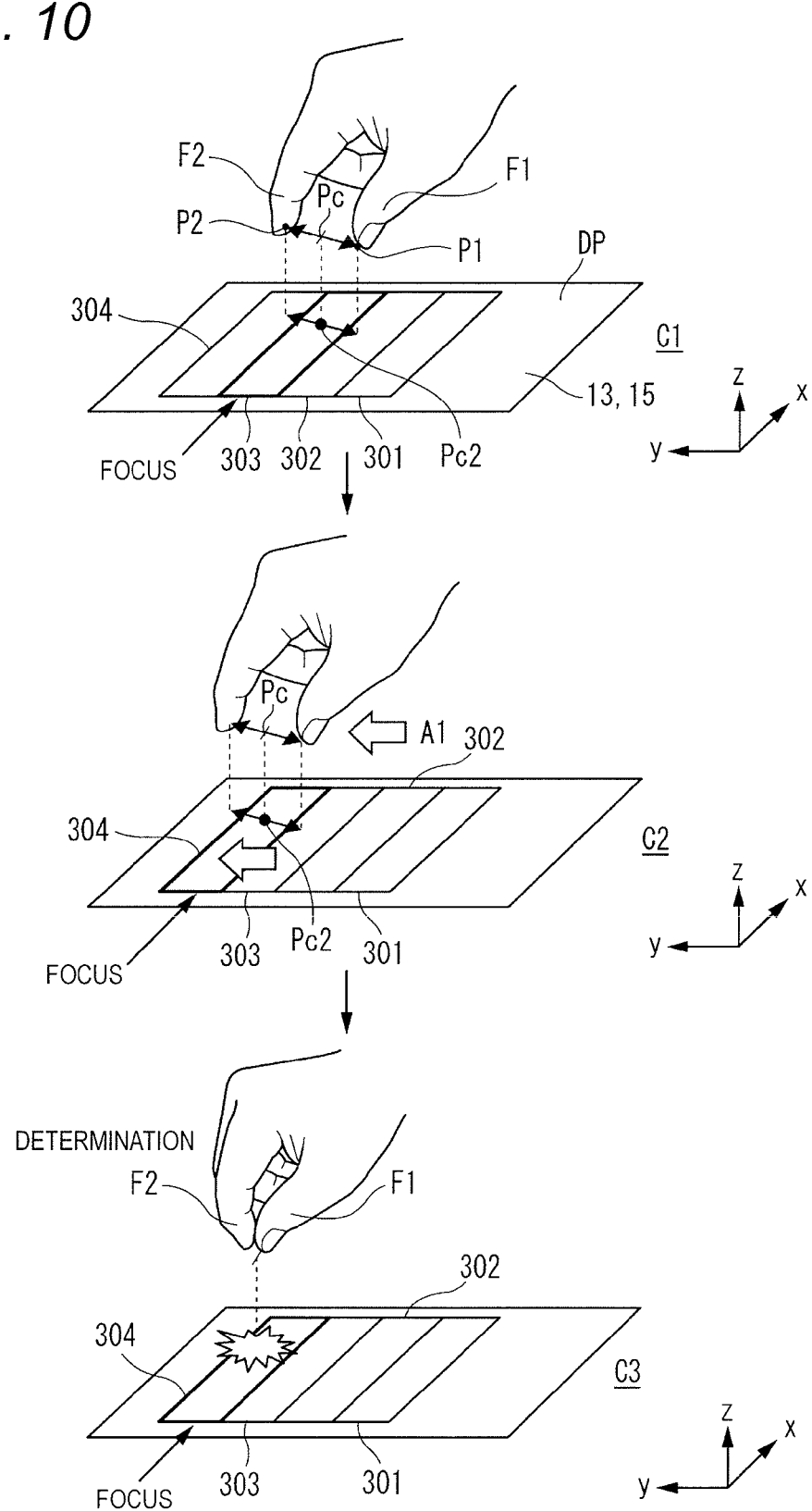
FIG. 10 is an explanatory diagram illustrating a specific example of state transition occurring in operating the input device of each embodiment.

Now, a specific example of a case where the input device 1 of each of the aforementioned embodiments controls the focus instead of the pointer PT will be described. FIG. 10 is an explanatory diagram illustrating a specific example of state transition occurring when the input device 1 of each embodiment is operated. Specifically, FIG. 10 illustrates transition from state C1 to state C2, and subsequently from state C2 to state C3.

As illustrated in FIG. 10, the display section 13 and the touch panel 15 are provided on the top surface of the housing corresponding to the operating surface of the input device 1. Besides, visual information of operable contents is displayed in the screen DP of the display section 13. Furthermore, an area 303 selected as an operation target is indicated with focus FC.

The focus FC indicates the area selected as the operation target in a different display form so as to be distinguishable from a display form of the other areas not indicated with the focus FC. For example, the area of interest is controlled to have brightness different from normal brightness, to be displayed to blink, to have a density of pixels displayed therein changed, or to have a display color changed. Thus, the area having the focus FC can be displayed in a state distinguished from the other areas. Accordingly, a user can visually distinguish the area having the focus FC from the other areas. In the example illustrated in FIG. 10, it is assumed that any one of rectangular areas 301, 302, 303 and 304 has the focus FC.

In state C1 of FIG. 10, a user holds two fingers F1 and F2 in a position in the proximity of the operating surface (the touch panel 15) to perform a "hover operation". In state C1 of FIG. 10, however, the two fingers F1 and F2 are spaced from each other to some extent. The position P1 of the finger F1 is expressed by proximity coordinates (x1, y1, z1), and the position P2 of the finger F2 is expressed by proximity coordinates (x2, y2, z2).

In state C1 of FIG. 10, since the two fingers F1 and F2 are simultaneously held, the input device 1 calculates, as coordinates for providing the focus FC, coordinates (xc, yc, zc) of a position Pc corresponding to a middle point between the position P1 of the finger F1 and the position P2 of the finger F2. Furthermore, the input device 1 obtains a position Pc2 on the operating surface (the touch panel 15) directly below the position Pc, namely, coordinates (xc, yc) of a position in the screen DP on the operating surface (the touch panel 15) corresponding to the position Pc, and determines that the focus FC is provided with the coordinates of the position Pc2 regarded as a reference.

Specifically, in state C1 of FIG. 10, the input device 1 selects the area 303 including the position Pc2 corresponding to the current reference position from the areas 301 to 304 that can be provided with the focus FC, and displays the area 303 with the focus FC provided. Incidentally, if there is no area including the position Pc2 corresponding to the current reference position in the areas 301 to 304 that can be provided with the focus FC, the input device 1 selects the closest area to display it with the focus FC provided.

State C2 of FIG. 10 is a state attained when the user has moved his/her hand including the fingers F1 and F2 parallel along a direction of an arrow A1 from state C1. Specifically, with a distance between the position P1 of the finger F1 and the position P2 of the finger F2 retained constant, the positions P1 and P2 move parallel in the direction of the arrow A1 in accordance with the parallel movement of the hand.

If the positions P1 and P2 move parallel with the distance therebetween retained constant as in state C2 of FIG. 10, the input device 1 updates the display position of the focus FC during or after the movement. Specifically, the input device 1 calculates, on the basis of the positions P1 and P2 having been changed through the parallel movement of the hand, coordinates (xc, yc, zc) of the position Pc of the middle point again. Incidentally, the parallel movement herein is not absolute parallel but may be substantially parallel movement close to absolute parallel movement. The distance between the position P1 and the position P2 may be varied within a range of a prescribed value and the movement may be slightly shifted from absolute parallel. Besides, with respect to simultaneous movement of a plurality of positions, there may be a small difference in time of making the movement.

Besides, the input device 1 obtains the coordinates (xc, yc) of the position Pc2 in the operating surface (the touch panel 15) directly below the position Pc, selects any one of the areas 301 to 304 on the basis of the obtained position Pc2, and displays the corresponding area with the focus FC provided.

In state C2 of FIG. 10, the area 304 including the position Pc2 is displayed with the focus FC provided. Accordingly, the input device 1 can successively specify each of the areas 301 to 304 as the area selected as the operation target when a user moves the positions of the fingers in the direction of the arrow A1.

State C3 of FIG. 3 is a state attained when the user has brought the fingers F1 and F2 close to each other to bring them into contact with each other from state C2. The contact between the finger F1 and the finger F2 means an operation of "determination" made by the user. In other words, the operation of "determination" is performed for deciding whether or not processing may be executed on an object (such as an icon of content) corresponding to the operation target displayed in the area 304 indicated with the focus FC provided.

In state C3 of FIG. 10, the input device 1 accepts the determination operation. Specifically, the input device 1 detects that the distance between the position P1 of the finger F1 and the position P2 of the finger F2 has become equal to or smaller than a prescribed value, and accepts the determination operation on the object corresponding to the operation target specified by the focus FC.

Incidentally, although it is assumed in the example of FIG. 10 that any one of the rectangular areas 301 to 304 is selected to be provided with the focus FC, any one of various objects present in the screen DP may be selected to be provided with the focus FC. For example, if icons of various objects are arranged at constant intervals in the screen, the area of an icon closest to the reference position Pc2 determined on the basis of the positions of the fingers is selected to be displayed with the focus FC provided.

In this manner, the display controlling section 60 of the input device 1 displays, as illustrated in FIG. 10, a display element in a position corresponding to or close to the pointer coordinates, out of a plurality of operable display elements (objects) displayed in the screen DP, to be distinguished from the other display elements. Therefore, the input device 1 can make an area to be operated by a user easily recognized by displaying the area with the focus FC in the screen DP.

The various embodiments have been described with reference to the accompanying drawings so far, and it goes without saying that the present invention is not limited to these examples. It will be apparent for those skilled in the art that various changes and modifications can be made in the embodiments and the embodiments can be variously combined within the scope of the appended claims, and such changes and modifications are intended to be included within the technical scope of the present invention.

Incidentally, this application is based upon the prior Japanese Patent Application (Japanese Patent Application No. 2012-101657) filed on Apr. 26, 2012, the entire contents of which are incorporated herein by reference.

INDUSTRIAL APPLICABILITY

The present invention is useful as an input device, an input assistance method, and a program simply realizing intuitive processing of an object displayed in a screen in accordance with an input operation performed by a user on a touch panel.

DESCRIPTION OF REFERENCE SIGNS input device
10 proximity detecting section
16 power source control section
17 communication control section
20 touch detecting section
51 sensor information acquiring section
52 finger coordinate calculating section
53 coordinate information storage section
54 finger distance calculating section
55 event detecting section
56 pointer coordinate calculating section
57 input information informing section
58 application processing section
59 time managing section
60 display controlling section
100 proximity coordinate extracting section
200 touch coordinate extracting section

The invention claimed is:

1. An input accepting method used with an input device including a display that includes a screen and a touch panel capable of detecting a distance to a finger from the screen and capable of detecting coordinates indicating a position of the finger along a surface of the screen, the input accepting method comprising:
detecting by the touch panel the distances to at least two finers from the screen being within a prescribed distance, and coordinates of the at least two fingers along the surface of the screen;
displaying an indicator on the screen when the touch panel simultaneously detects the distances to the at least two fingers from the screen being within the prescribed distance, the indicator including a first pattern at a position corresponding to a middle point of the at least two fingers projected onto the screen along an axis transverse to the screen, a second pattern extending from the middle point to a first finger of the at least two fingers projected onto the screen along the axis transverse to the screen, and a third pattern extending from the middle point to a second finger of the at least two fingers projected onto the screen along the axis transverse to the screen;
generating a first event in response to determining that the at least two fingers are in contact with each other, based on the coordinates of the at least two fingers when the touch panel simultaneously detects the distances to the at least two fingers from the screen being within the prescribed distance;
generating a second event in response to determining that the at least two fingers having come into contact with each other once and then have become spaced from each other, based on the coordinates of the at least two fingers when the touch panel simultaneously detects the distances to the at least two fingers from the screen being within the prescribed distance; and
generating a third event in response to determining that the at least two fingers having come into contact with each other twice and then have become spaced from each other, based on the coordinates of the at least two fingers when the touch panel simultaneously detects the distances to the at least two fingers from the screen being within the prescribed distance.

2. The input accepting method according to claim 1, further comprising:

moving the indicator in response to a movement of the at least two fingers when the at least two fingers move simultaneously in a direction substantially parallel to each other.

3. The input accepting method according to claim 1, further comprising:
displaying a display element, of a plurality of operable display elements displayed on the screen, in accordance with a position of the indicator or being in the proximity of the indicator so as to distinguish the display element from other of the plurality of operable display elements.

4. A non-transitory computer-readable recording medium that stores an input accepting program, which is executable by a computer as an input device, the computer including a display that includes a screen and a touch panel capable of detecting a distance to a finger from the screen and capable of detecting coordinates indicating a position of the finger along a surface of the screen, the input accepting program causing the computer to execute:
detecting, by the touch panel, the distances to at least two fingers from the screen being within a prescribed distance, and coordinates of the at least two fingers along the surface of the screen;
displaying an indicator on the screen when the touch panel simultaneously detects the distances to the at least two fingers from the screen being within the prescribed distance, the indicator including a first pattern at a position corresponding to a middle point of the at least two fingers projected onto the screen along an axis transverse to the screen, a second pattern extending from the middle point to a first finger of the at least two fingers projected onto the screen along the axis transverse to the screen, and a third pattern extending from the middle point to a second finger of the at least two fingers projected onto the screen along the axis transverse to the screen;
generating a first event in response to determining that the at least two fingers are in contact with each other, based on the coordinates of the at least two fingers when the touch panel simultaneously detects the distances to the at least two fingers from the screen being within the prescribed distance;
generating a second event in response to determining that the at least two fingers having come into contact with each other once and then have become spaced from each other, based on the coordinates of the at least two fingers when the touch panel simultaneously detects the distances to the at least two fingers from the screen being within the prescribed distance; and
generating a third event in response to determining that the at least two fingers having come into contact with each other twice and then have become spaced from each other, based on the coordinates of the at least two fingers when the touch panel simultaneously detects the distances to the at least two fingers from the screen being within the prescribed distance.

5. An input device comprising:
a display that includes a screen;
a touch panel capable of detecting a distance to a finger from the screen and capable of detecting coordinates indicating a position of the finger along a surface of the screen;
a display controller; and
an event detector,
wherein the touch panel detects the distances to at least two fingers from the screen being within a prescribed distance, and coordinates of the at least two fingers along the surface of the screen,
the display controller displays an indicator on the screen when the touch panel simultaneously detects the distances to the at least two fingers from the screen being within the prescribed distance, the indicator including a first pattern at a position corresponding to a middle point of the at least two fingers projected onto the screen along an axis transverse to the screen a second pattern extending from the middle point to a first finger of the at least two fingers projected onto the screen along the axis transverse to the screen, and a third pattern extending from the middle point to another one of the at least two fingers projected onto the screen along the axis transverse to the screen, and
the event detector generates:
a first event in response to determining that the at least two fingers are in contact with each other, based on the coordinates of the at least two fingers when the touch panel simultaneously detects the distances to the at least two fingers from the screen being within the prescribed distance;
a second event in response to determining that the at least two fingers having come into contact with each other once and then have become spaced from each other, based on the coordinates of the at least two fingers when the touch panel simultaneously detects the distances to the at least two fingers from the screen being within the prescribed distance; and
a third event in response to determining that the at least two fingers having come into contact with each other twice and then have become spaced from each other, based on the coordinates of the at least two fingers when the touch panel simultaneously detects the distances to the at least two fingers from the screen being within the prescribed distance.

6. The input accepting method according to claim 1, further comprising:
changing the indicator to a second indicator having a pattern different from the indicator, in response to an acceptance of the first event.

* * * * *